Figure 1:
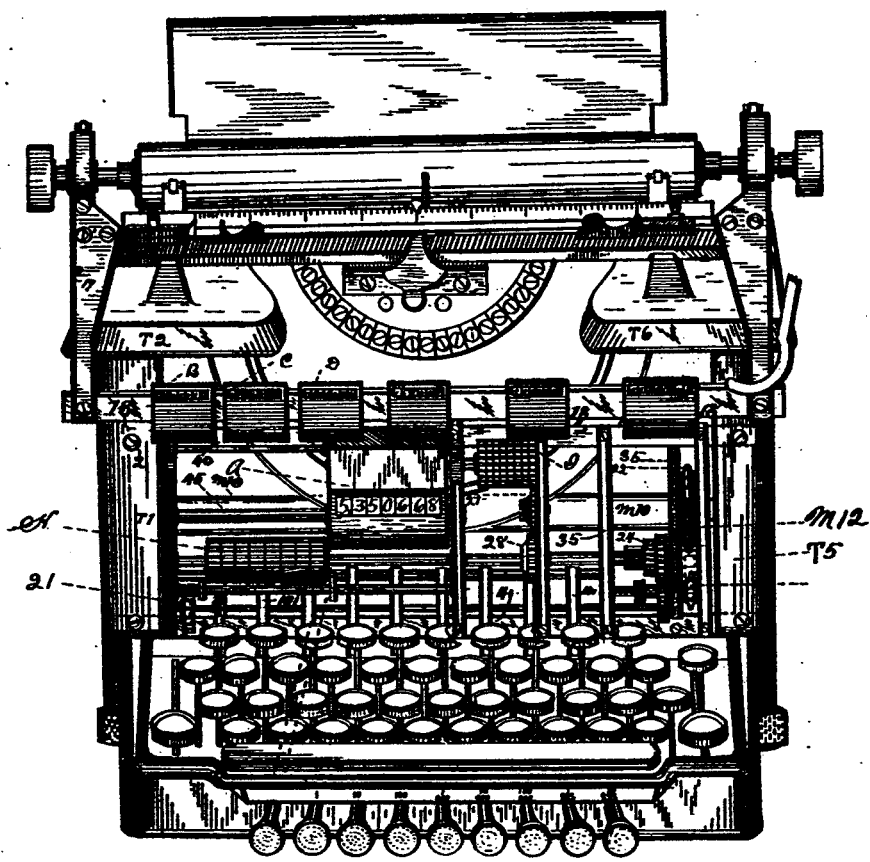

H. L. PITMAN.
CALCULATING APPARATUS FOR TYPE WRITERS, &c.
APPLICATION FILED DEC. 3, 1910.

1,045,434.

Patented Nov. 26, 1912.
14 SHEETS—SHEET 1.

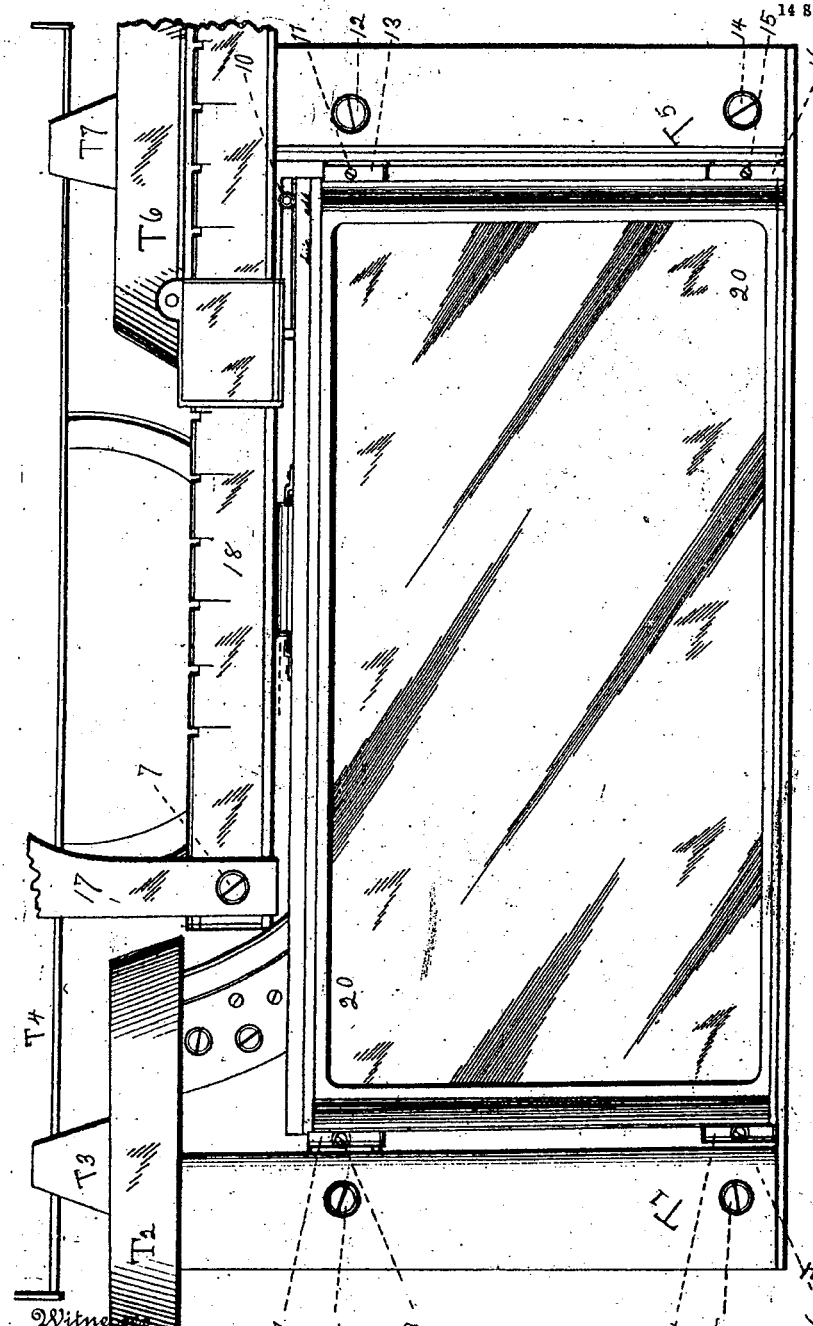

H. L. PITMAN.
CALCULATING APPARATUS FOR TYPE WRITERS, &c.
APPLICATION FILED DEC. 3, 1910.
1,045,434.
Patented Nov. 26, 1912.
14 SHEETS—SHEET 3.
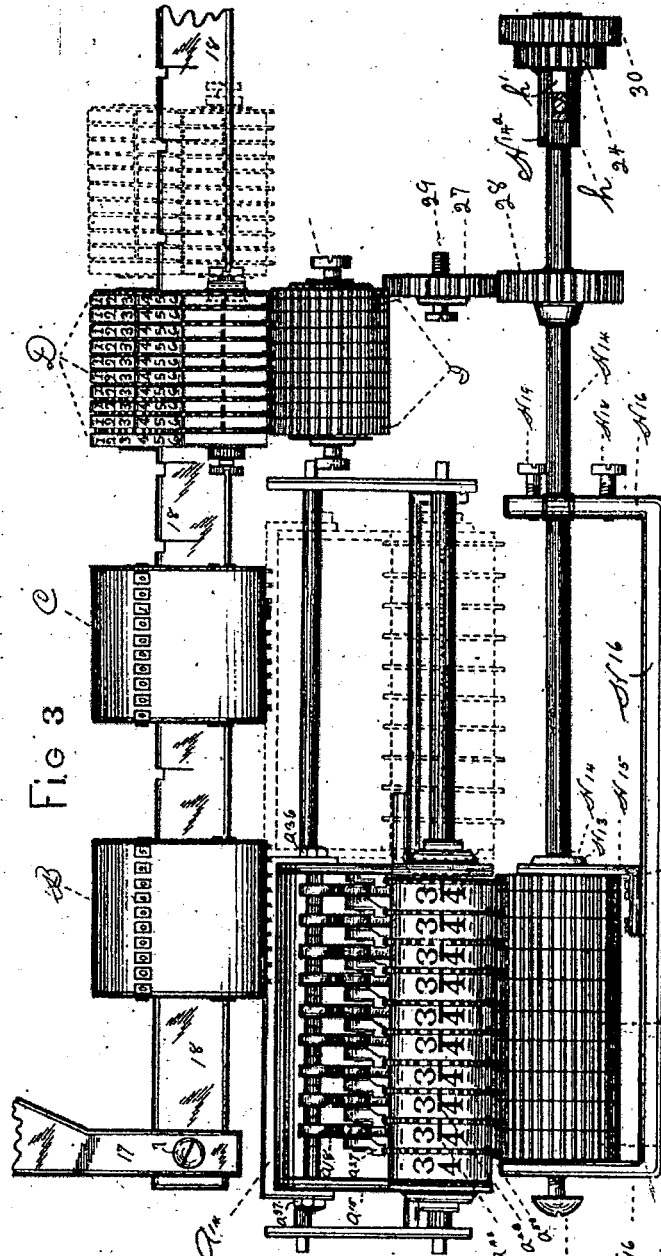
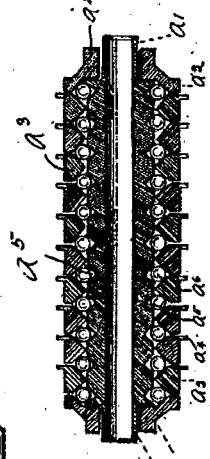
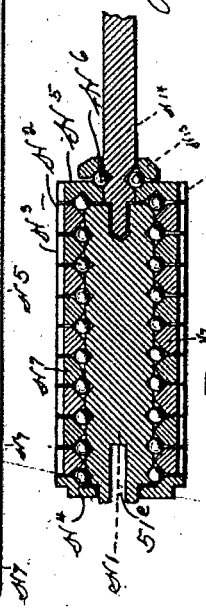
Witnesses
Geo. L. Thom
A. L. Hough
Inventor
Henry L. Pitman.
By Franklin N. Hoyt
Attorney

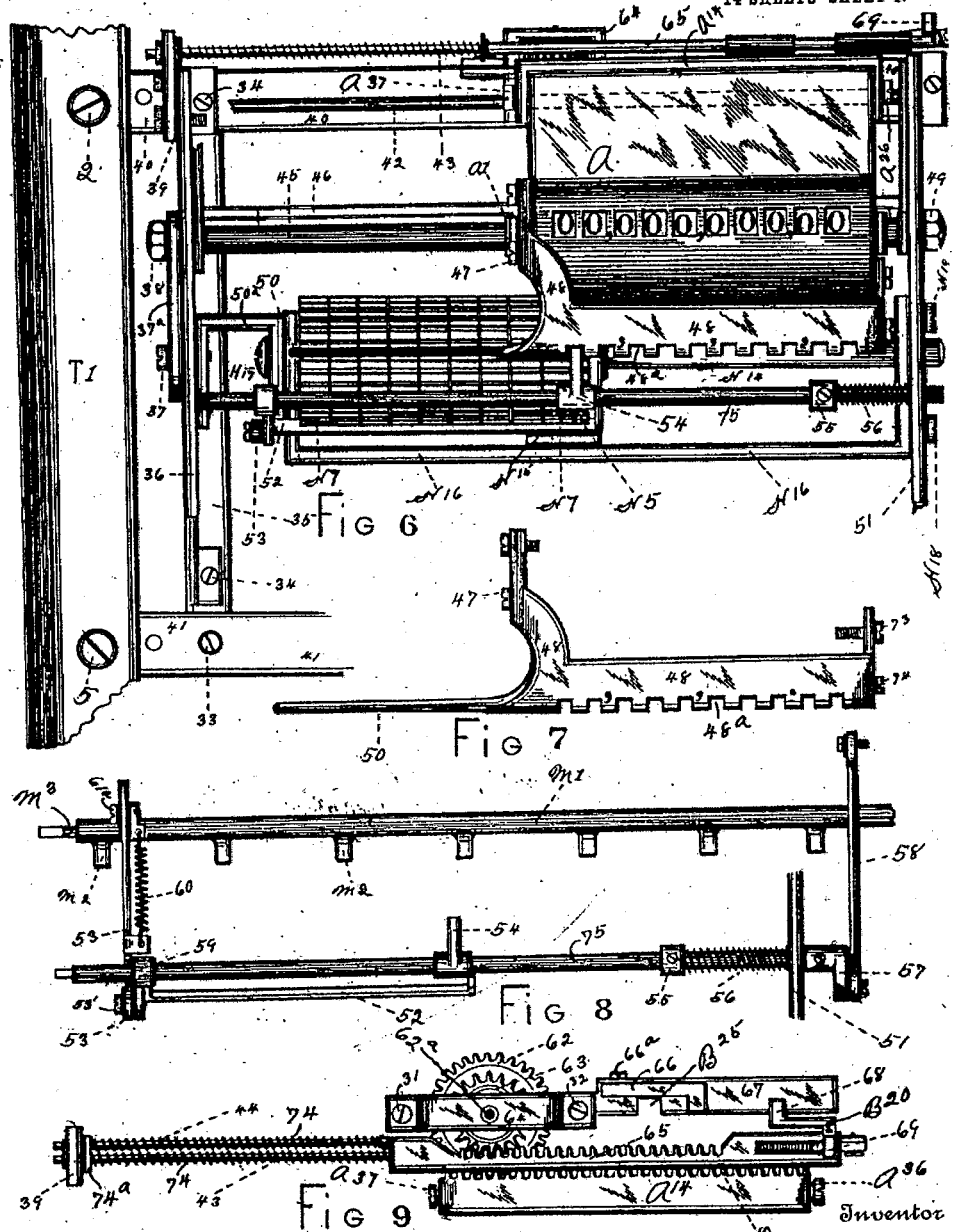

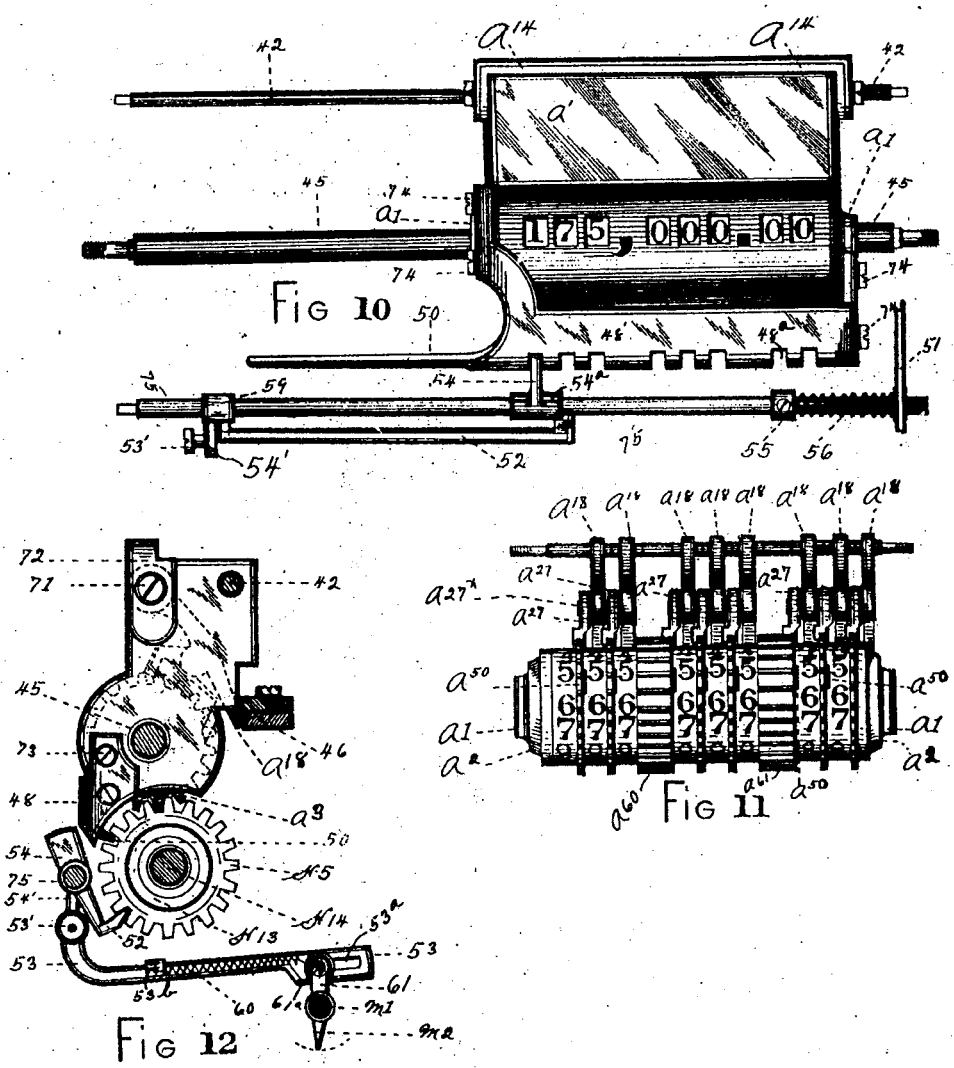

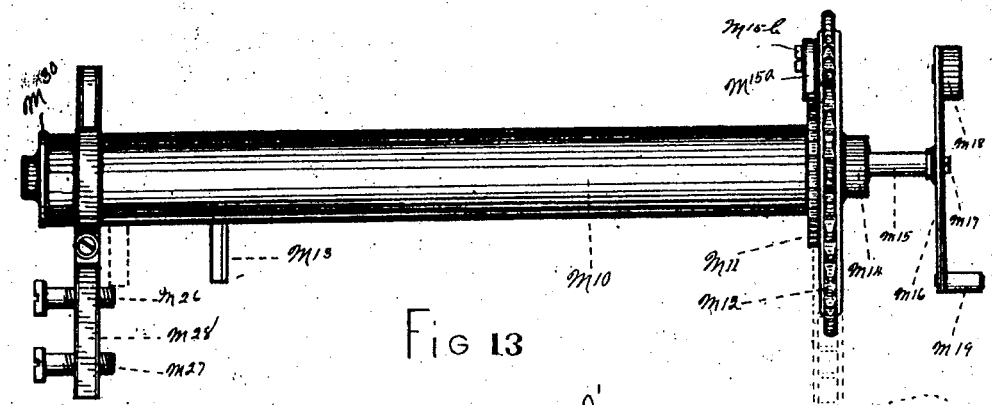

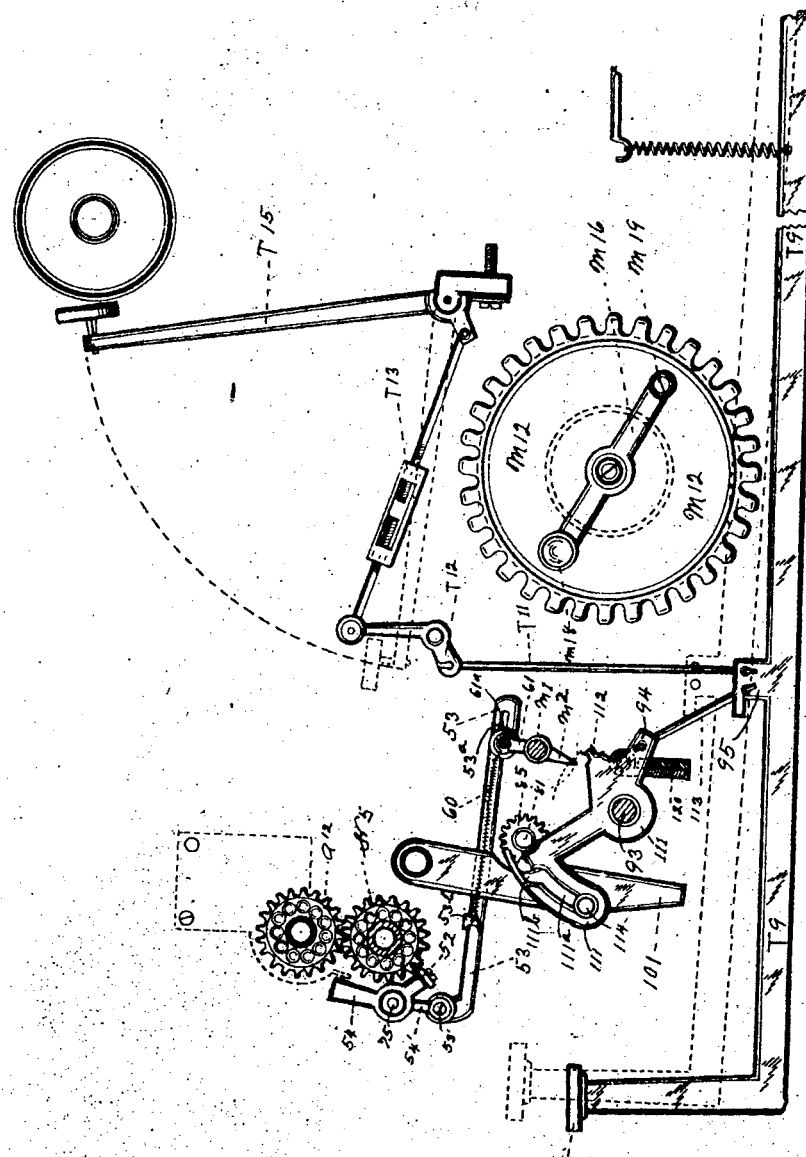

H. L. PITMAN.
CALCULATING APPARATUS FOR TYPE WRITERS, &c.
APPLICATION FILED DEC. 3, 1910.
1,045,434.
Patented Nov. 26, 1912.
14 SHEETS—SHEET 8.
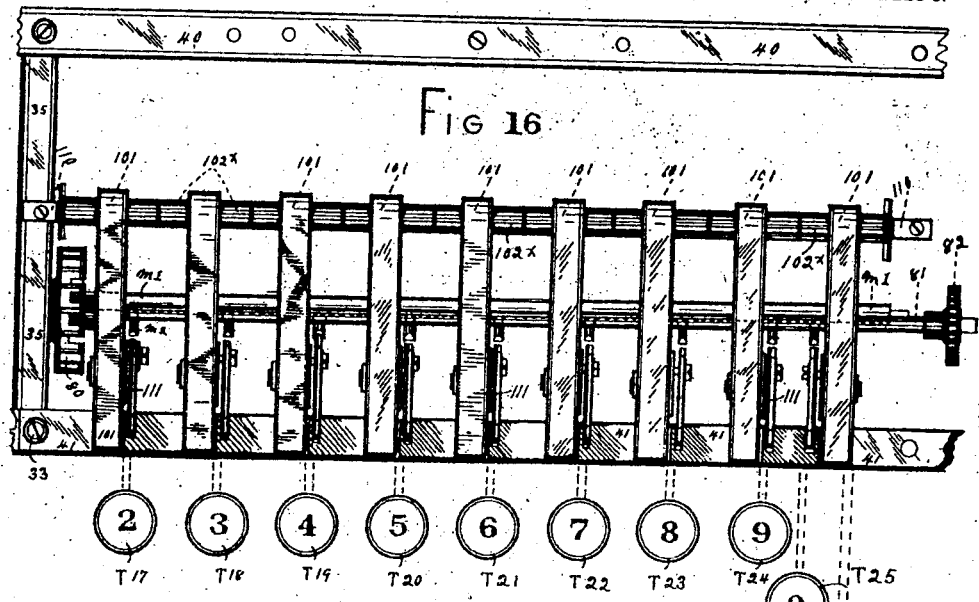
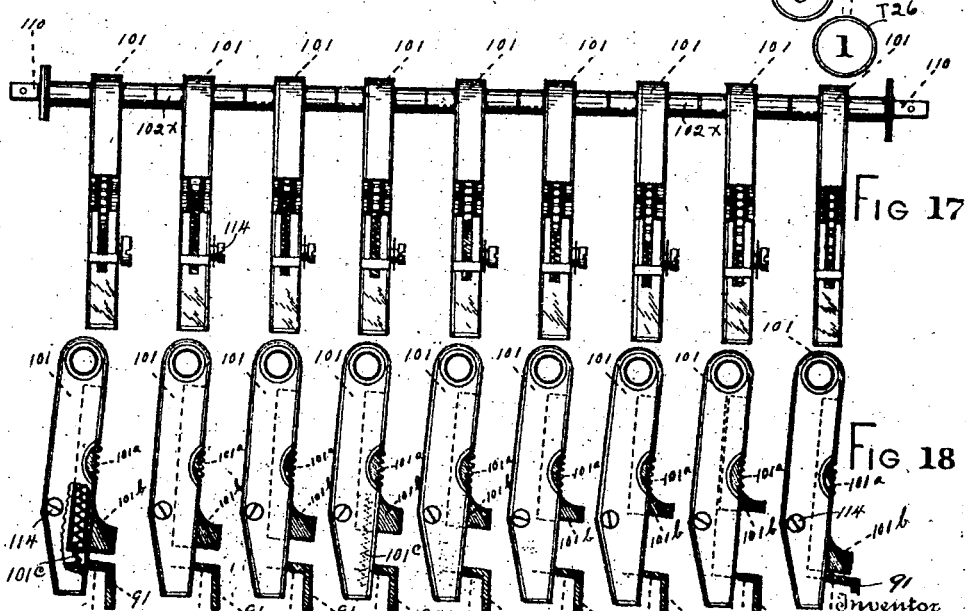
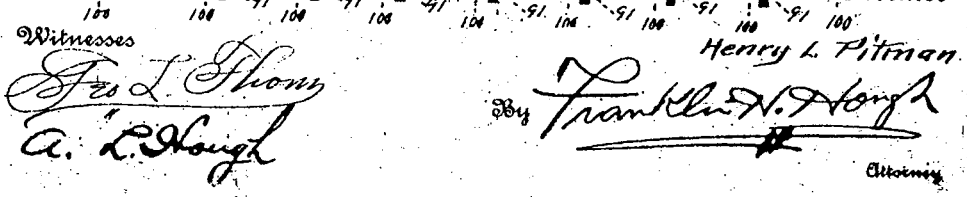

H. L. PITMAN.
CALCULATING APPARATUS FOR TYPE WRITERS, &c.
APPLICATION FILED DEC. 3, 1910.
1,045,434.
Patented Nov. 26, 1912.
14 SHEETS—SHEET 9.
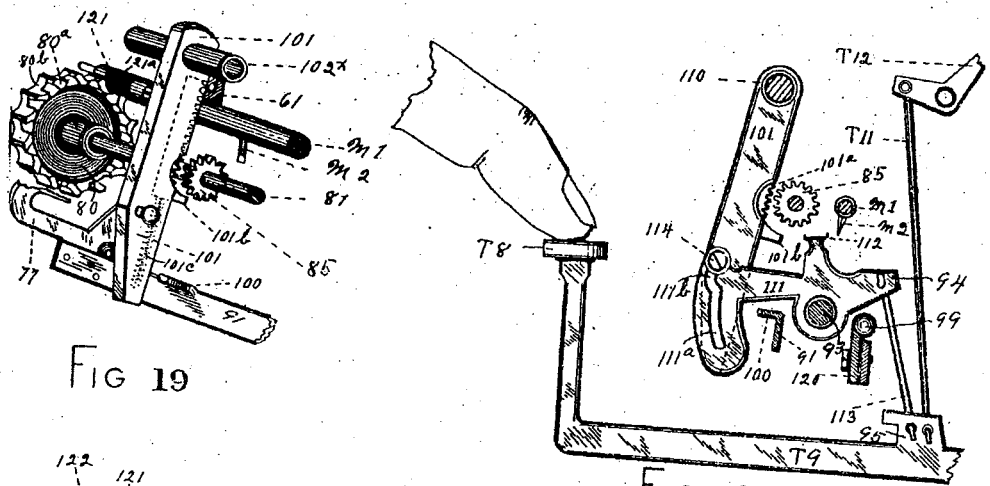
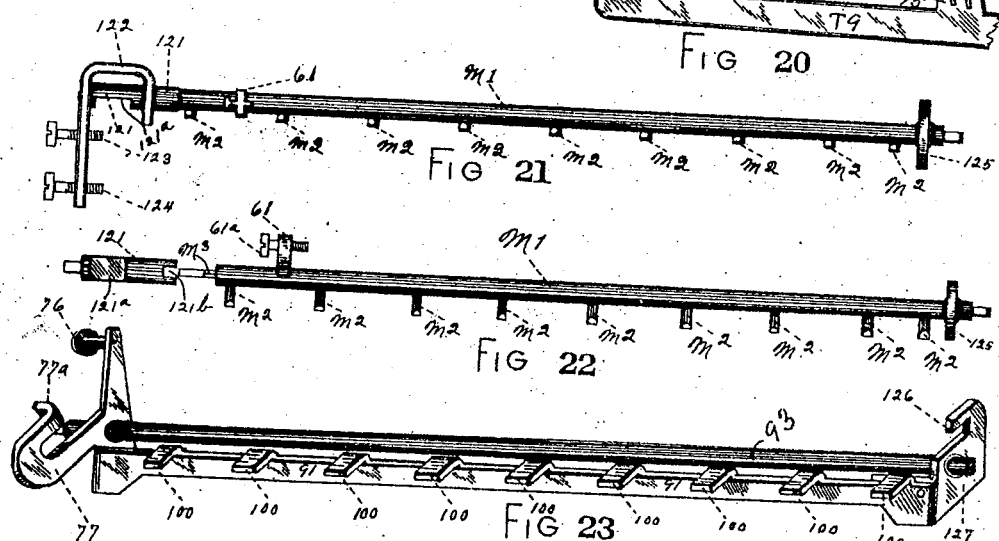
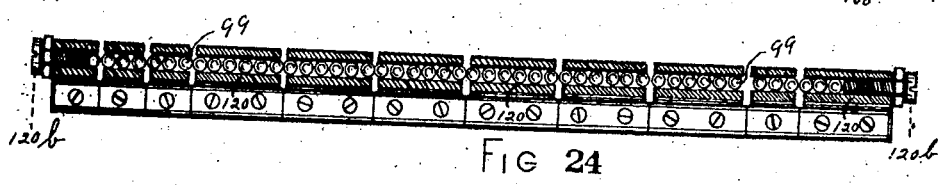

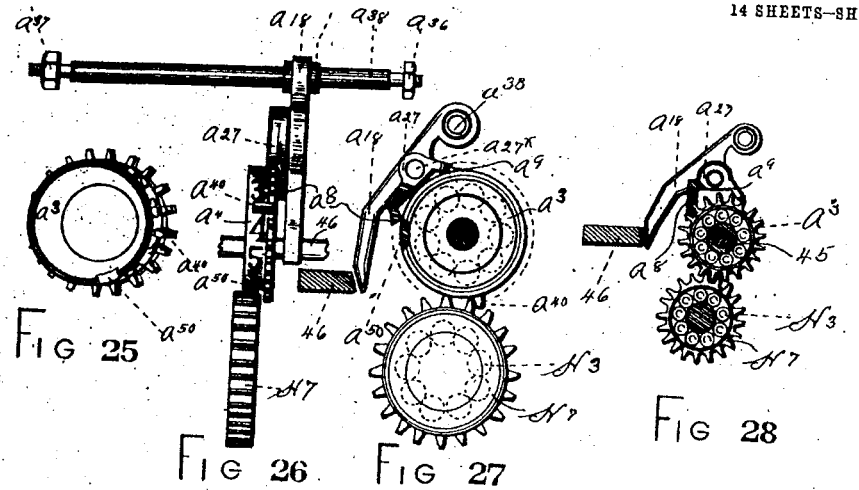
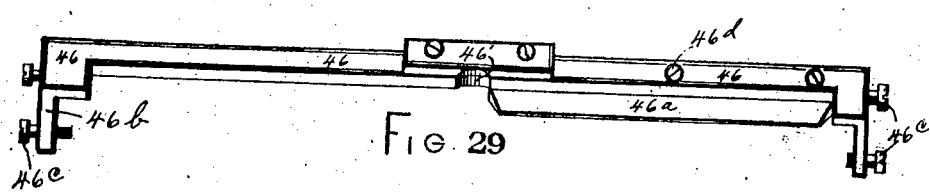
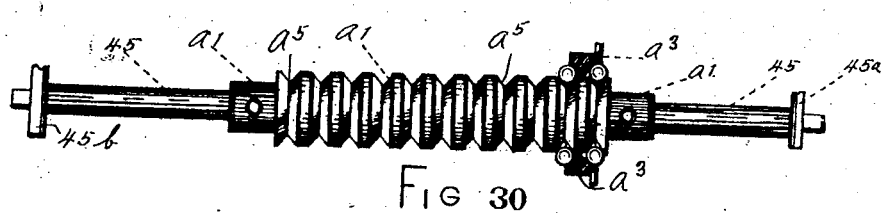

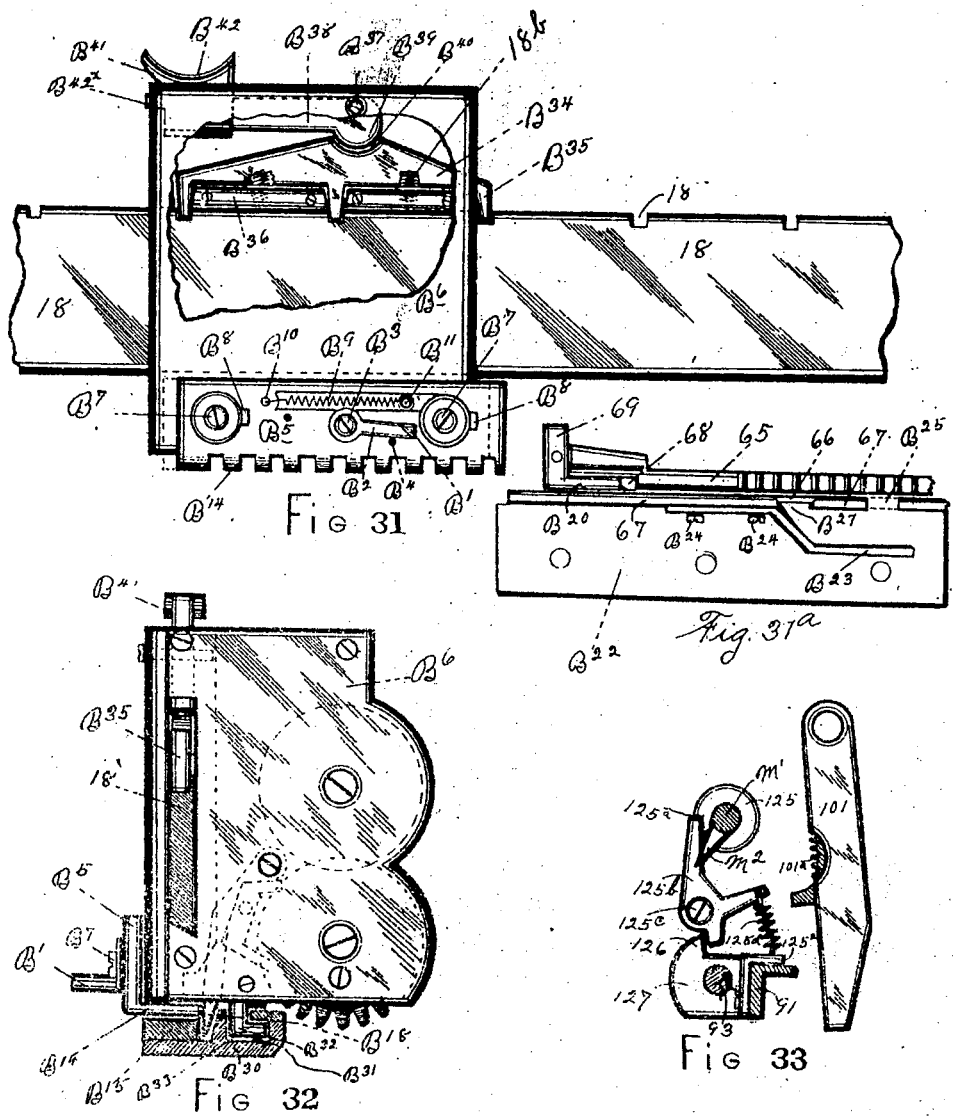

H. L. PITMAN.
CALCULATING APPARATUS FOR TYPE WRITERS, &c.
APPLICATION FILED DEC. 3, 1910.

1,045,434.

Patented Nov. 26, 1912.

14 SHEETS—SHEET 12.

Witnesses
Geo. J. Thom
A. L. Hough

Inventor
Henry L. Pitman
By Frank N. Floyd
Attorney

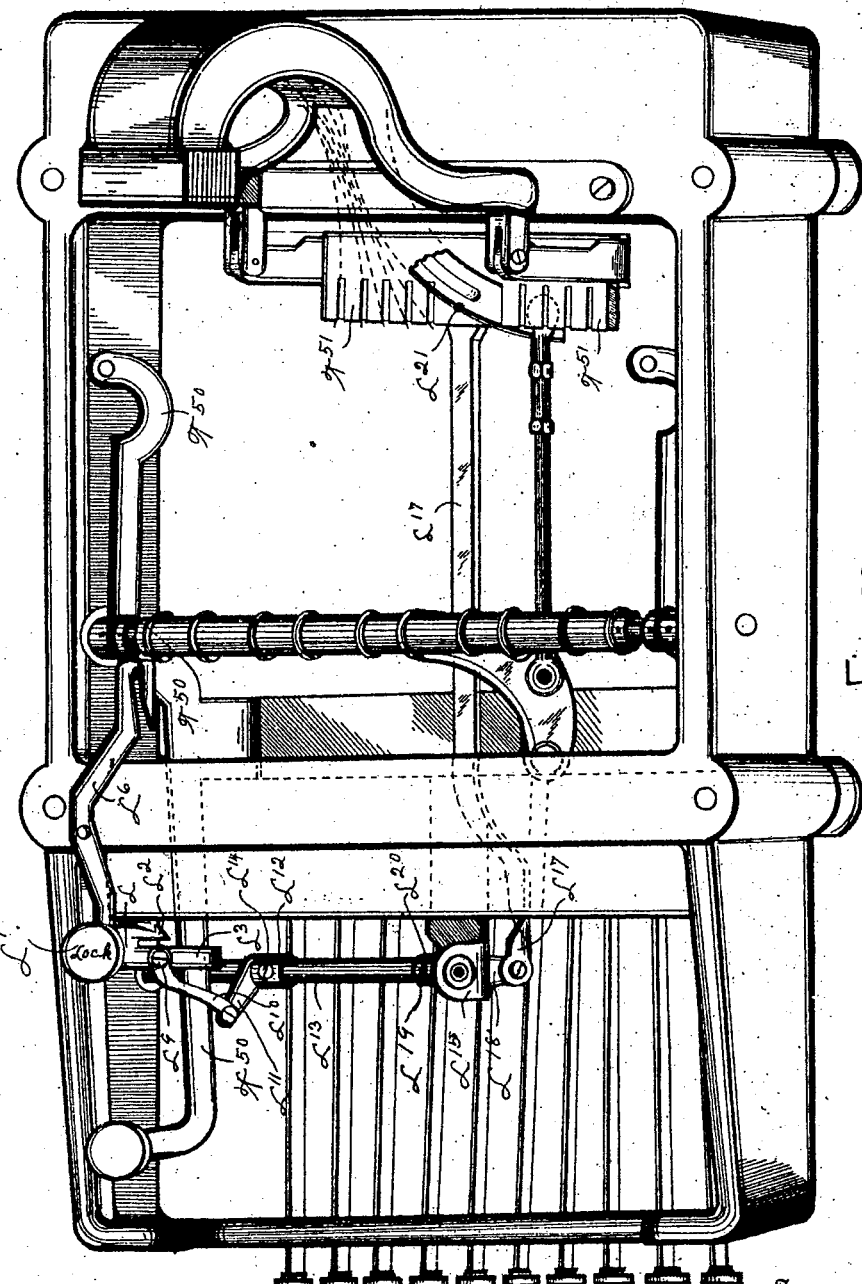

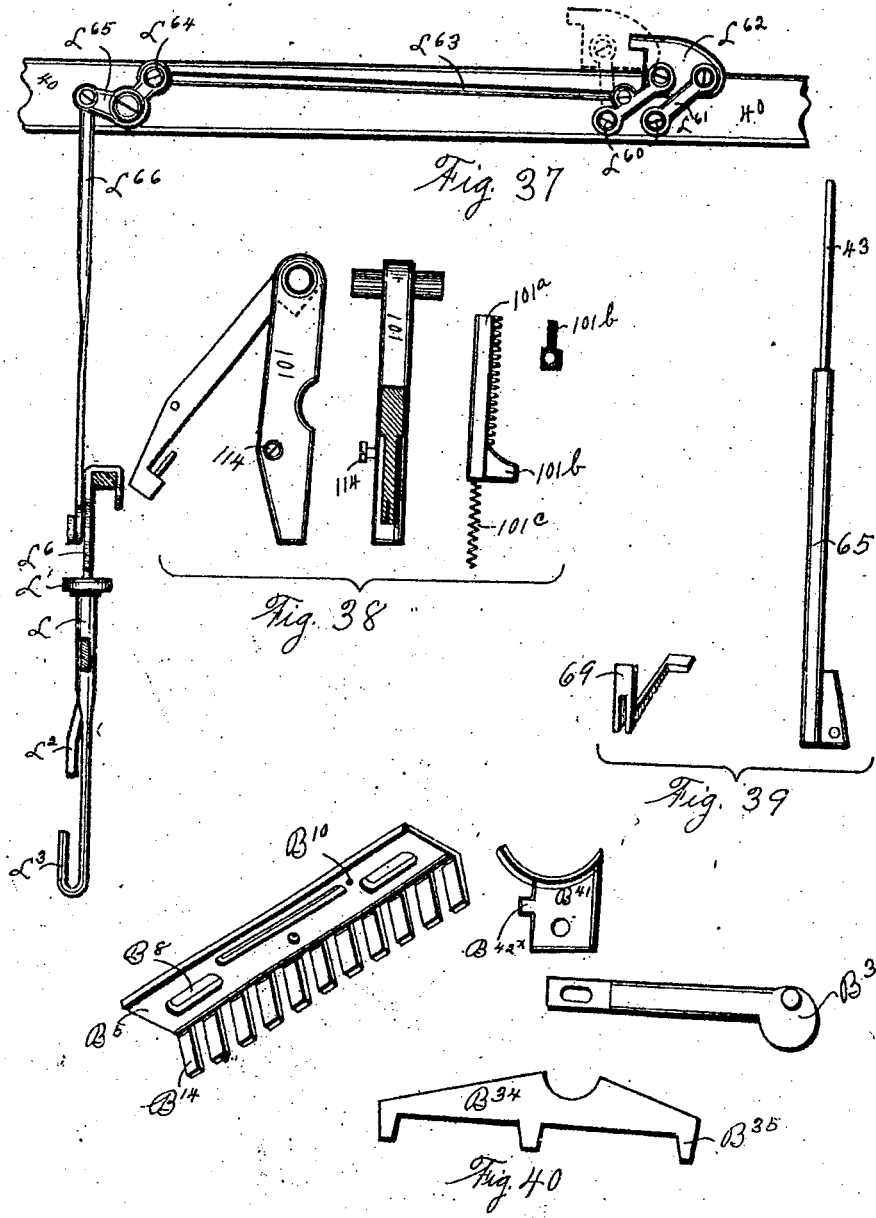

UNITED STATES PATENT OFFICE.

HENRY L. PITMAN, OF PINEVILLE, KENTUCKY.

CALCULATING APPARATUS FOR TYPE-WRITERS, &c.

1,045,434.　　　　　Specification of Letters Patent.　　Patented Nov. 26, 1912.

Application filed December 3, 1910. Serial No. 595,538.

*To all whom it may concern:*

Be it known that I, HENRY L. PITMAN, a citizen of the United States, residing at Pineville, in the county of Bell and State of Kentucky, have invented certain new and useful Improvements in Calculating Apparatus for Type-Writers, &c; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in calculating machines of the motor driven type for typewriters of various kinds and the object in view is to produce a simple and efficient means for automatically adding, subtracting, multiplying and dividing the numerals.

The invention consists essentially in the provision of means for regulating the rotary movement to be imparted to the registering wheels by the employment of motor or driven rack bars, the length of the rack bar determining the registering movement, each rack bar representing a certain numeral key.

Another feature of the invention consists in the provision of means whereby the series of registering wheels and carrying pinions may have independent sliding movements in parallel planes for the purpose of automatically breaking the connections between the registering wheels to be operated upon and all of the registering wheels to the right.

My invention comprises various other details of construction and combinations and arrangements of parts which will be hereinafter fully described and then specifically defined in the appended claims.

I illustrate my invention in the accompanying drawings, in which:—

Figure 34:
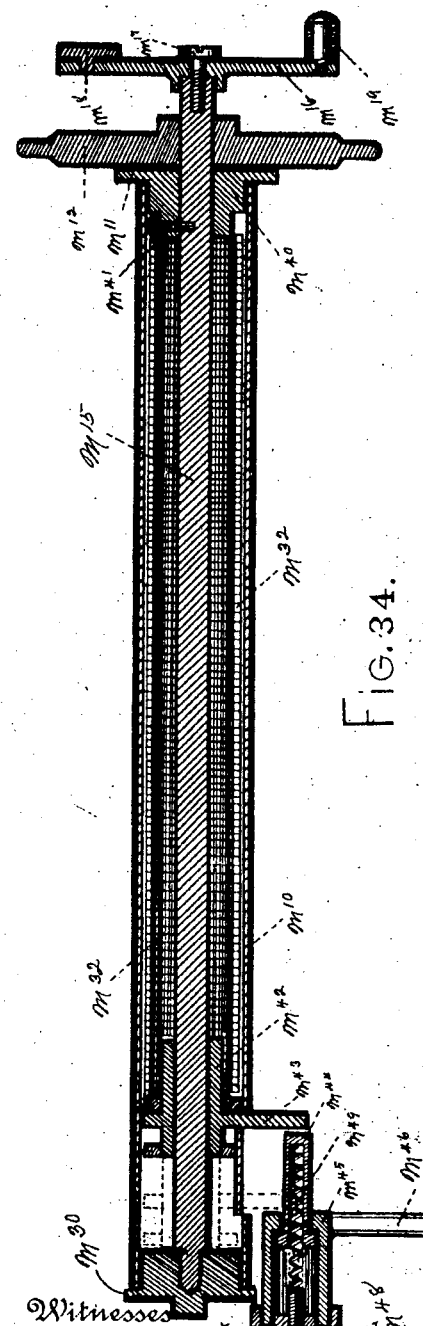
Figure 35:
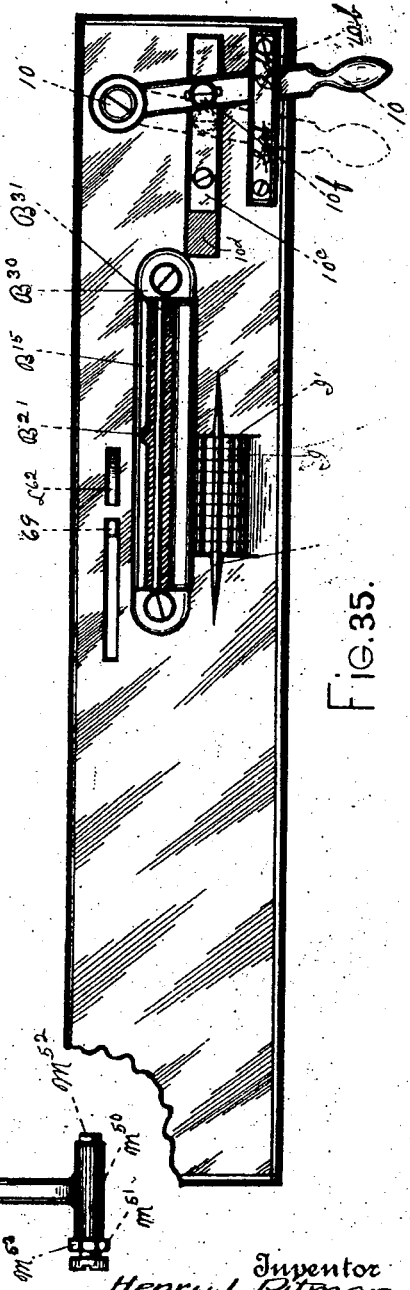

Figure 1 is a front elevation of the typewriter showing my calculating apparatus applied thereto, parts being removed to better illustrate the application of the invention. Fig. 2 is a detail elevation of a casing inclosing the apparatus. Fig. 3 is an enlarged detail in elevation of the registering wheels, carrying pinions and auxiliary totalizers. Fig. 4 is a central longitudinal sectional view through the carrying pinions and master pinion and illustrating the central core and annular race ways for ball bearings. Fig. 5 is a central longitudinal sectional view through the series of registering wheels and hollow core illustrating annular grooves for race ways for ball bearings. Fig. 6 is an enlarged detail in front elevation illustrating the transferring pinions and casing, the sight apertures adapted to disclose the numerals upon the registering wheels. Fig. 7 is an enlarged detail view of a guard movable with the registering wheels. Fig. 8 is a detail view of rock shafts, one of which is adapted to actuate means for permitting the escapement of the motor and moving parts actuated thereby, the other adapted to regulate the position of the registering wheels and also to assist in alining the transferring pinions. Fig. 9 is a top plan view of means for causing the frame of the registering wheels constituting the totalizer to accelerate over the movement of the type writer carriage. Fig. 10 is a detail in elevation showing a slight modification of the mechanism illustrated in Fig. 6, showing means for grouping the numerals upon the paper and upon the totalizer. Fig. 11 is an enlarged detail view of registering wheels of the totalizer utilized in grouping the numerals in the manner shown in Fig. 10. Fig. 12 is an enlarged end elevation of the totalizer and the transferring pinion mechanism. Fig. 13 is a plan view showing the transferring pinion apparatus and escapement mechanism with motor and connections for driving the apparatus. Fig. 14 is a detail view of a rack bar actuated mechanism for regulating and locking the escapement wheel shown in Fig. 13. Fig. 15 is an end view showing a key of a typewriter with connections between the same and with the mechanism for imparting an intermittent movement or movements to the registering wheels and transferring pinion. Fig. 16 is a front elevation showing the casings carrying the motor driven rack bars and illustrating diagrammatic arrangements of the numerals keys. Fig. 17 is a rear elevation of the series of motor driven rack bars and casings in which the same are mounted. Fig. 18 illustrates a series of individual rack bars and casings containing the same with the tread bar shown in section. Fig. 19 is a detail perspective view illustrating one of the motor driven rack bars, escapement wheel and means for allowing the same to rotate. Fig. 20 is a detail view showing normal relative positions of the typewriter key, motor driven rack bar, casing therefor and connections with the type bar. Fig. 21 is a detail view of a rock shaft adapted to allow the escapement wheel to rotate. Fig. 22 is a similar view of the shaft illustrated in Fig. 21 in a slightly different position. Fig. 23 is a perspective view of the rack bar actuated mechanism shown in a different position from that illustrated in Fig. 14. Fig. 24 is a detail sectional view showing mechanism for preventing the operation of two typewriter keys simultaneously. Fig. 25 is a detail perspective view of one of the registering wheels. Fig. 26 is a detail in edge view of one of the pinion carrying wheels, registering wheel and means for holding the registering wheels in alinement. Fig. 27 is a side elevation of the mechanism illustrated in Fig. 26. Fig. 28 is a sectional view showing the mechanism illustrated in Fig. 27 with the anti-friction balls in solid lines. Fig. 29 is a detail view of mechanism to allow and prevent the rotary movement of the registering wheels. Fig. 30 is a detail of the core for the registering wheels, one of the latter being shown in section. Fig. 31 is an enlarged detail in rear elevation of mechanism for fastening the auxiliary totalizers to the universal bar of the machine. Fig. 31$^a$ is a detail view of a portion of the frame and parts interposed in the pathway of the auxiliary totalizers. Fig. 32 is a sectional view through the universal bar showing in end elevation the mechanism illustrated in Fig. 31. Fig. 33 is a detail view of mechanism for automatically holding the motor and connections open until the calculation is accomplished. Fig. 34 is a central longitudinal view through the motor mechanism showing the various means for regulating the movement of the escapement wheel. Fig. 35 is a top plan view of the casing and illustrating a lever for shifting the calculating mechanism. Fig. 36 is a bottom plan view of a typewriter illustrating the connections for automatically locking the calculating mechanism when not in use, and means for releasing the locking device when a tabulator key is depressed. Fig. 37 is another view of the locking device showing the connection between the locking key and the totalizer. Figs. 38, 39 and 40 are detail views of parts of the apparatus.

Reference now being had to the details of the drawings by letters and numerals, T' designates the upright portion of the frame of a typewriter and T$^2$, T$^3$, T$^4$, T$^5$, T$^6$ and T$^7$ designate the ordinary parts of the frame of a visible Remington typewriter in connection with which I have applied my invention, it being understood that it is my intention to so construct my calculating apparatus that it may, with slight alterations, be applicable to various makes of typewriters. Secured to the upright portion of the frame of the typewriter are the bars 40 and 41 which are parallel to each other and connected by the vertically disposed strips 35. Fixed to the vertical strips 35 is a shaft 110 having mounted thereon a series of sleeve 102$^x$, shown clearly in Fig. 17 of the drawings, and each of said sleeves passes through and has secured thereto a casing 101 adapted each to contain a longitudinally movable rack bar 101$^a$, which rack bar has a laterally extending portion 101$^b$, comprising a foot piece, and each rack bar is of a different length in order to determine the amount of rotary movement to be imparted to each registering wheel by the motor and connection. Each rack bar has a hollow or chambered portion, preferably in its lower end, for the reception of a spring 101$^c$, serving to return the rack bar to its normal position after having been driven in one direction by the motor apparatus which will be hereinafter described. Also journaled in the vertical strips 35 is a shaft 81, shown clearly in Fig. 13 of the drawings, and which has keyed thereto a series of pinions 85, each of which is adapted to mesh with one of the rack bars 101$^a$ for the purpose of driving the rack bar to its lowest limit when a particular key connected to the casing is depressed, thus limiting the rotary movement of a number wheel which will be presently described. Portions of the opposite sides of the casings 101 are cut away in order to allow the pinion wheels to mesh freely with the rack bars. Fixed to the shaft 81 is an escapement wheel 80 having a series of ratchet teeth 80$^a$ formed about its circumference, shown in Figs. 13 and 19 and which are adapted to be engaged by a dog 77$^a$ formed integral with the hook-shaped projection 77 upon the bar 91, as clearly illustrated in Fig. 23 of the drawings. When the rack bar 101$^a$ is moved downward by the pinion 85 and the foot piece 101$^b$ approaches its lower limit, the latter strikes the lug 100 on the bar 91, pressing the bar downward, thus bringing the dog 77$^a$ into engagement with the teeth 80$^a$ of the ratchet wheel, thus locking the motor against further rotary movement. This arrangement takes the shock or strain off of the rack bar 101$^a$, facilitating the disengaging of the rack bar 101$^a$ from the pinion 85, as will hereinafter be explained. It will be understood that the action of the dog 77$^a$ in engagement with the teeth of the ratchet wheel 80 forms a temporary stop only. The permanent stop is effected by the following mechanism: Said ratchet wheel is provided with a series of scallops 80$^b$ about its circumference, adapted to be engaged by the cylindrical portion of the member 121 (Figs. 19, 21, and 22) which is journaled in a yoke 122 fastened to the strips 35, forming a portion of the frame of the apparatus, and set screws 123 and 124 are mounted in said yoke and adapted to hold the latter in place. It will be noted that the member 121 has a recess 121$^a$ formed therein, as shown clearly in Figs. 19, 20, 21 and 22, provided for the purpose of allowing the escapement wheel to rotate when said member 121 is properly positioned.

In order to open the calculating mechanism and release the motor automatically when the key is depressed in the regular manner and to prevent the return of the key to its normal position before the operation is completed by the calculating device, the following mechanism is provided: One end of the member 121 is provided with a recess 121$^b$, adapted to receive the contracted end $M^3$ of the shaft $M'$ whereby, as the latter rocks, a similar rocking movement may be imparted to the member 121. Fixed to the shaft $M'$ is a disk wheel 125, shown in Figs. 21 and 33 of the drawings, which is provided with a notch 125$^a$ in the circumference thereof which is adapted to be engaged by a pivotal dog 125$^b$ to prevent the return of the shaft $M'$ to its normal position before the calculation shall have been completed. When the typewriter key is depressed in the regular manner, the dog 125$^b$ engages the notch 125$^a$ to prevent the return movement of the key until the calculation is completed and the disk 125 released by the means hereinafter described. Said bar 125$^b$ is mounted upon a pivotal pin 125$^c$ fastened to one of the strips 35, and 125$^d$ designates a spring, one end of which is fastened to an arm of the dog 125$^b$ and its other end fastened to an angled member 125$^e$ fastened to the bar 91.

127 designates a bracket member which is apertured for the reception of a shaft 93 upon which it is pivotally mounted, said shaft 93 being fastened to the vertical strips 35. Upon reference to Fig. 23, it will be noted that the bracket member having the hook-shaped projection 77 is also journaled upon the shaft 93 upon which the bar 91 is adapted to have a rocking movement.

Mounted to rock upon the shaft 93 is a series of segment members 111, each having pivotal connection by means of a rod 113 with the shank portion $T^9$ of a type key $T^8$ of the typewriter, which shank portion $T^9$ is pivotally connected to the typewriter frame in the usual manner. A rod $T^{11}$ pivotally connects the shank portion of each type key with an angled lever $T^{12}$ which in turn is pivotally connected by means of adjustable rods $T^{13}$ which are connected to a type carrying bar $T^{15}$. Said segment member 111 is provided with an elongated slot 111$^a$ having an offset 111$^b$ in the marginal edge thereof.

114 designates a headed pin which is fastened to the casing containing a rack bar and is adapted to move within said slot 111$^a$, said offset being adapted to receive the pin 114 to hold the rack-bar normally out of mesh with pinion wheel 85 or in an inoperative position, (see Fig. 20,) but when the pin is positioned in the slot intermediate the offset and its inner end, the pinion and rack bar will be in mesh with each other, as shown in Fig. 15. Each of said segments is provided with a lateral projection having two points 112 adapted, as the segment is rocked upon the bar 93, to contact with a finger $M^2$ which projects from the shaft $M'$.

In Fig. 15 of the drawings, I have illustrated by dotted lines the arcs of a circle that said points and finger would describe as the latter rock upon their respective shafts. Through the mechanism shown in Fig. 15, when the key 8 is depressed, the points 112 will contact with the points $M^2$ upon the shaft $M'$ and cause the latter to rock. Said rocking motion of the shaft $M'$ is imparted to the member 121, bringing the recess 121$^a$ opposite the ratchet wheel 80, thereby releasing the ratchet wheel. Simultaneously with this movement, the disk 125 on the other end of the shaft $M'$ is rotated until the notch 125$^a$ comes to the position shown in Fig. 33 of the drawings when the dog 125$^b$ engages said notch 125$^a$, thus locking the key against its return movement until the disk shall have been released from its engagement by the dog, as will be hereinafter described. Projecting from the shaft $M'$ is an apertured lug 61 carrying a set screw 61$^a$ therein, and 53 designates an arm having an elongated slot 53$^a$ therein through which the set screw 61$^a$ passes, and 60 designates a coiled spring fastened at one end to said screw and its other end to a lug 53$^b$ which is fixed to the arm 53, the purpose of said spring being to normally hold the set screw 61$^a$ against one end of the slot 53$^a$, as shown in Fig. 15 of the drawings. The object of this mechanism is to release the carrying pinions and registering wheels from their respective alining members and permit the same to be rotated by the motor simultaneously with the engagement of the rack 101$^a$ with its respective pinion 85, as heretofore described.

Pivotaly connecting a finger 94 of each segment 111 with a lug 95 upon the shank portion of the key lever is a rod 113, affording means for rocking the segments 111 each time one or another of the keys is depressed.

The following is a description of the general registering mechanism: Fastened to the strip 35 (Fig. 6) is a bracket plate 36 secured by means of screws 34, and 51 designates another plate which is secured to the cross-pieces 40 and 41, and 50ᵃ is a bracket member adjustably fastened to the plate 36 by means of a screw 37, and 37ᵃ designates a link which is pivotally mounted upon the shaft 45 and held thereon by means of a nut 38, said link receiving the screw 37. Said bracket member 50ᵃ has mounted therein a screw H¹⁷ which is received by a recess 51ᶜ in the core H′, shown in Fig. 4 of the drawings, and adapted to support one end of said core while the other end of the core has a recess adapted to form a bearing for the shaft H¹⁴ which is journaled in suitable bearings in the bail-shaped member H¹⁶ which is fastened by means of set screws H¹⁸ and H¹⁹ to the plate 51 at one end and its other end is supported by the screw which is fastened to the bracket member 50ᵃ. In order to form a rigid support for the end of the shaft H¹⁴, the bail shaped member H¹⁶ is provided which has a bracket member H¹⁵ fastened thereto which is apertured for the reception of a cone bearing H¹³, shown in Fig. 4 of the drawings. Said core H′ is provided with a series of circumferential grooves H² forming race ways for the anti-friction balls H³, and H⁴ designates a cup which is fastened to a shouldered portion of the core at one end thereof, preferably by threaded connection, and H⁵ designates a master pinion wheel which is fastened to the shaft H¹⁴, suitable ball bearings H⁶ being interposed between said pinion H⁵ and the cone H¹³, as shown in Fig. 4 of the drawings. H⁷ designates series of pinion transferring rings having their inner peripheries formed of double bevels and forming outer bearings for the balls H³.

An essential provision of the present invention, in order to obtain accuracy in calculations, resides in the particular manner in which the carrying pinions as well as the registering wheels are constructed, that is by having the ball bearings arranged in the manner shown in Figs. 4 and 5 of the drawings, which will prevent lost motion incident to lateral movements of the pinions.

Another and an essential feature in the successful operation of my calculating apparatus is obtained by the ball bearing arrangement for the reason that the transfer pinions are retained with their beveled teeth in strict alinement in order to allow the teeth in the series of registering wheels to move freely back and forth in parallel relation with the transfer pinions without interference under the normal tension of the mechanism which actuates the carriage of the typewriter.

In the operation of the device, should it happen that the teeth of one or more of the carrying pinions be out of strict alinement with the other carrying pinions and the teeth of the registering wheel, the teeth of the latter will strike against the beveled edges of the teeth on the particular carrying pinion which may be out of alinement and have a tendency to drive it against the next adjacent carrying pinion wheel. But the anti-friction balls interposed between the different carrying pinions and resting upon the core H′ will take up this pressure and transmit it to the core instead of to the next adjacent carrying pinion, thus permitting a free independent movement of each carrying pinion. In other words, the lateral pressure of one carrying pinion is not brought to bear upon an adjacent carrying pinion but upon the core H′ and absorbed by it. The teeth which are out of alinement are returned to their normal position by the pressure of the teeth of the registering wheels upon a beveled surface of the teeth of said carrying pinions. Typewriter operators are accustomed to a regular tension on the typewriter carriage and any addition to this tension or strengthening of the force of this spring is objectionable for the reason that it interferes with the operation of the machine and also for the reason that slightly additional pressure on the carriage of the typewriter will lock and absolutely prevent the normal spacing of the carriage.

The usual construction of the registering wheels and supporting members is shown in Figs. 3 and 5 of the drawings. A hollow core A′ is provided upon the ends of which are fitted cups A², held by screw-threaded connections. The circumference of the core A′ is provided with series of annular grooves forming race ways A⁵ with beveled edges, and A³ designates register wheels or rings having series of teeth A⁴ about their periphery and the inner marginal edge of each wheel or ring is provided with a double beveled surface similar to the construction of the transfer pinions illustrated in Fig. 4 of the drawings, and ball bearings A⁶ are mounted intermediate the grooves of the core and the beveled faces upon the inner periphery of the registering wheels. Each registering wheel has one of its teeth, designated by letter A¹⁰, wider than the other teeth upon the same ring or wheel and is adapted, at each revolution of the wheel or ring, to engage a tooth of one of the carrying pinions to impart an intermittent movement thereto which in turn transfers an intermittent movement to the next adjacent registering wheel to the left, which is the ordinary method of transferring in registering mechanism from one wheel to another.

Referring to Figs. 25 to 28 inclusive of the drawings there will be seen pawl mechanism for allowing an intermittent movement to be imparted to the registering wheel by means of the widened tooth $A^{40}$, which consists of the pawls $A^{27}$ and the fingers $A^{18}$. Such pawls are journaled upon a stud $A^{27x}$ which projects from the face of said finger, the latter being journaled upon a shaft $A^{38}$ which is held in the vertically disposed plates $A^{15}$ and also in the ends of the bail-shaped member $A^{14}$, the latter and said plates being held together by means of the nuts $A^{36}$ and $A^{37}$ fitted to the threaded ends of the shaft, as shown clearly in Fig. 3 of the drawings. 46 designates a bar having angled ends $46^{b}$ which are apertured for the reception of the set screws $46^{c}$, which set screws engage the plates 36, the purpose of which bar 46 being to force the fingers $A^{18}$ to hold the pawls $A^{27}$ firmly against the teeth of the registering wheels to prevent the same from rotation and also to hold the same in true alinement which is an essential in the effective operation of the invention. The bar 46 is grooved as at 46′ in order to allow the free ends of the fingers $A^{18}$ to rise slightly so as to lift the pawl $A^{27}$ out of connection with the teeth of the register wheels, thus permitting the latter to be rotated by the master pinion $H^{5}$. It will be noted that the action of the pawl and fingers $A^{18}$ is caused by the action of the motor on the number wheel imparting to it a tendency to rotate and this rotary motion forces the finger upward, the fingers being allowed to enter the recess as it comes in registration with the fingers. It will be understood that there are only two positions that the registering wheels assume in which it is possible for them to be turned, one of which is when the finger $A^{18}$ comes opposite the groove 46′ and the other when the recess $A^{50}$ formed in the circumference of the registering wheel comes opposite and under the end $A^{8}$ of the pawl, which permits said end $A^{8}$ to drop into the recess $A^{50}$, thus releasing the teeth of the adjacent registering wheel to the left and permitting it to be rotated by its respective carrying pinion which receives its motion from the tooth $A^{40}$ upon the registering wheel having the recess $A^{50}$. It will be understood that one end $A^{9}$ of the pawl $A^{27}$ rests upon the teeth of the registering wheel immediately to the left of the registering wheel upon which rests the end $A^{8}$.

It is essential that the frame carrying the series of registering wheels move at a considerable greater speed than the normal speed of the carriage in writing and to accomplish this I provide the mechanism shown in Fig. 9 of the drawings, in which the bar $A^{14}$ has a series of teeth $A^{10}$ which are adapted to mesh with a pinion 62 which is fixed to the pin $62^{a}$ which is mounted in the plate 64. A second pinion 63, having half the number of teeth as the pinion 62, is also fixed to the pin $62^{a}$ and is in mesh with the teeth of the rack bar 65 which has two rods 43 and 44 projecting therefrom and which are guided in apertures in the bar 39. Springs, designated by numeral 74, are mounted upon said rods 43 and 44 and bear between a plate $74^{a}$ and the end of the rack bar 65.

Referring to Figs. 31 and 32 of the drawings there will be seen auxiliary totalizers B to each of which an arm $B^{2}$ is fastened, having a lug B′ projecting therefrom, and designed to contact with the angled member 69 on the rack bar 65, shown in Fig. 9 of the drawings, to cause rapid movement of the registering wheels. Said arm is pivotally mounted upon a screw $B^{3}$ and normally rests upon a pin $B^{4}$ projecting from the plate $B^{5}$ which is fastened to a plate $B^{6}$ by screws $B^{7}$ passing through the slots $B^{8}$. A spring $B^{9}$ is fastened at one end in a hole $B^{10}$ in the plate $B^{5}$, its other end being fastened to a pin $B^{11}$ projecting from the plate $B^{6}$. Each auxiliary totalizer is mounted upon a bar 18 fastened to the arms 17 of the carriage, as shown in Fig. 1 of the drawings.

In the drawings I have illustrated two series of intermeshing wheels, the rotary movements of which are controlled by pawl and finger mechanism illustrated in Fig. 32 in dotted lines and which is similar in construction to the pawl and finger mechanism before described and illustrated in Figs. 26, 27 and 28, with the exception that the bar 46 is dispensed with and its function is performed by the fingers $B^{14}$ of the plate $B^{5}$, and the plate $B^{15}$, illustrated in Figs. 31, 32 and 35 of the drawings, presses upon the end of the fingers $B^{18}$ and prevents any motion thereof. But, when the lug B′ comes in contact with the angled end 69 of the bar $B^{20}$, the pressure forces the plate $B^{5}$ to the position shown in dotted lines in Fig. 31, thus bringing the opening between the fingers $B^{14}$ opposite the end of the fingers $B^{18}$ and releasing them. Said fingers $B^{18}$ are now held by the plate $B^{15}$ which acts upon the same in a similar manner as the bar 46 acts upon the fingers $B^{18}$ of the general totalizer. The bar $B^{15}$ has a recess $B^{21}$ (Fig. 35) provided to allow the finger $B^{18}$ a swinging movement similar to the movement permitted by the bar 46. The plate $B^{22}$, which is adapted to be fastened to the plate 40, has an angled flange 67 to which the angled finger $B^{23}$ is fastened by the screws $B^{24}$. Said flange 67 has an aperture $B^{25}$ therein to permit the lug 68 to pass therein when opposite said opening and as pressure is exerted upon the angled end 69 by the lug B′. A pivotal trap, designated by numeral 66, swings upon a pivot $66^{a}$, shown in Fig. 9 of the drawings, and has its end beveled slightly in order to fit into the opening $B^{27}$ and normally close the same. As the lug 68, after passing through the aperture B²⁵, is pressed back by the action of the springs 74, said lug is guided by the angled finger B²³ and, coming against the trap, raises the same, which latter is held down by gravity and, after passing by the trap, returns to its normal position and said trap will close to the position shown in Fig. 31ᵃ of the drawings.

Referring to Figs. 32 and 35 there will be seen a plate B³⁰ which is chambered as at B³¹ for the reception of an angle plate B³² which is held in place within the channel by means of the plate B³³. The object of this construction is to strengthen the auxiliary totalizers and prevent their being shoved aside or moved from the correct position by the force of the motor acting upon the register wheels through the master mechanism. In order to firmly hold the auxiliary totalizers B in an adjusted position upon the bar 18, I provide a block B³⁴ having fingers B³⁵ projecting therefrom which are adapted to engage the notches 18ᵃ formed in the upper marginal edge of the bar 18 and normally held out of said notches by means of springs 18ᵇ which bear between the bottoms of recesses formed in the block B³⁴ and recess in the blocks B³⁶, which latter are secured to the casing B⁶. Pivotally mounted eccentrically upon a pin B³⁷ carried by the casing B⁶ is a lever B³⁸ which has a convexed portion B³⁹ adapted to engage a concaved recess B⁴⁰ formed in the upper edge of the block B³⁴. Said lever B³⁸ has a sliding member B⁴¹ mounted thereon which has a concaved recessed portion N⁴², forming means whereby said member may be moved back and forth upon the lever and also has a contracted projecting portion B⁴²ˣ which, when moved to its farthest limit in one direction, engages an aperture in the casing B⁶, serving to lock the lever to the position shown in Figs. 31 and 33 of the drawings. When it is desired to allow the lever B³⁸ to swing, the member B⁴¹ may be moved a slight distance upon the lever to free the projecting portion B⁴²ˣ thereof from the casing, after which said lever may be swung upon its pivot and the convexed portion thereof having a cam action against the concaved recess in the block B³⁴ will cause the same to be thrown toward the bar 18 with the fingers engaging the recess 18ᵃ therein, thus serving to lock the totalizers in a fixed position upon the bar 18, thus holding the same secure and rigid.

Referring to Figs. 13 and 34 there will be seen the motor for driving the apparatus and in which M¹⁰ designates a hollow cylindrical casing supported by brackets M²⁸ in any suitable manner upon the frame of a typewriter. M³⁰ designates a flanged plug in which one end of the shaft M¹⁵ has a bearing, and M¹¹ is a ratchet wheel which is fixed to said shaft M¹⁵ and has teeth adapted to engage a pawl M¹⁵ᵃ carried upon the sprocket wheel M¹² and pivoted thereto by pin M¹⁵ᵇ. A bar M¹⁶ having a counterbalance M¹⁸ is fixed to the shaft M¹⁵ and has a handle M¹⁹, said bar being held to the shaft by a nut M¹⁷. A coiled spring M³² is mounted about the shaft M¹⁵ and has one end fastened to a shoulder upon the collar M⁴⁰ which is fastened by the pin M⁴¹ to the shaft M¹⁵. The other end of the coiled spring is fastened to a sliding collar M⁴² which has a finger M⁴³ projecting therefrom and adapted to be guided in an elongated slot in the lower portion of the cylindrical casing in which the spring is mounted. Said finger M⁴³ serves two purposes, first to prevent the rotary movement of the adjacent end of the spring and also to serve as an abutment for the hollow cylindrical tubular member M⁴⁴ which telescopes within the shell M⁴⁵ which is integral with the tilting lever M⁴⁶, which latter is pivotally mounted upon a pivot M⁴⁷. A headed screw M⁴⁸ has connection with interior threads formed in the nut M⁴⁵ˣ and a spring M⁴⁹ bears intermediate said screw M⁴⁸ and the inner closed end of the tubular member M⁴⁴ and serves to regulate the pressure upon the member M⁴⁴ by the adjustment of the screw M⁴⁸. Integral with one end of the lever M⁴⁶ is a cylindrical tubular shell M⁵⁰ in which is mounted an adjusting screw M⁵¹, containing preferably a buffer M⁵² upon its inner end, and M⁵³ is a jam nut mounted upon the screw to hold it in adjusted position, the latter being adapted to be adjusted to compensate for wear upon the buffer.

Mounted upon a counter shaft M²¹ is a sprocket wheel M²⁰ having sprocket chain connection M²⁰ᵃ with the sprocket wheel M¹². A pinion wheel M²² is fixed to the counter shaft M²¹ and is in mesh with the pinion wheels 82 and 30, which latter is fixed to a shell H¹⁴ᵃ which has a longitudinal sliding movement upon the shaft H¹⁴, which movement is limited by the pin h movable within the slot h' in said shell. A second pinion, designated by numeral 24, which is fixed to the shell H¹⁴ᵃ and pinion 30 and of smaller diameter than said pinion, has the same number of teeth as the latter and which are adapted, when the shell H¹⁴ᵃ is moved to the left a certain distance for the purpose of subtracting, to intermesh with the teeth M²⁵. Mounted upon the shaft h² journaled in suitable bearings is the idle pinion wheel h⁴ which is utilized to reverse the rotary motion of the shaft H¹⁴ and parts connected therewith when the shell H¹⁴ᵃ is moved so that the pinion 24 will mesh with said pinion h⁴ and in which position the pinion wheels 30 and M²² would be out of mesh. It will be understood that the pinion wheel 30 is utilized for adding and multiplying, while the pinion wheel M²⁴ is utilized for subtracting and dividing.

The shell H¹⁴ᵃ is moved longitudinally through the medium of the lever 10, pivotally mounted upon a pin 10ᵃ, shown in Figs. 2, 13 and 35, and 10ᵇ is a plate fastened to the casing and serving as a guide to the swinging movements of the lever 10.

10ᶜ designates a plate adapted to have a longitudinal sliding movement in a slot 10ᵈ of the casing, which plate 10ᶜ serves to prevent dust entering the slot and has a finger 10ᵉ fixed thereto which, at its lower end, has a swivel connection with the shell H¹⁴ᵃ. The plate 10ᶜ has a loose pivotal connection, through the medium of the pivotal screw 10ᶠ, with the lever 10.

A pinion M²³ is mounted upon the shaft M²¹ and has the same number of teeth as the wheel M²², although of smaller diameter, and each tooth of a pitch corresponding with the pitch of the teeth of the pinion h⁴ with which it is adapted to intermesh. A pinion wheel 82 is fixed to the shaft 81 and meshes with the wheel M²², receiving rotary motion therefrom to drive the various spring-pressed rack bars before described.

28 is a pinion wheel which is fixed to the shaft H¹⁴ and intermeshes with the teeth of a pinion 27 mounted upon a pivotal screw 29 adapted to be fastened to a part of the frame of the apparatus. The pinion 27 is adapted to intermesh with the master pinion I′ which in turn, coöperating with the carrying pinions I, is adapted to rotate the registering wheels of any of the subtotalizers, designated by letters B, C and D in Fig. 3 of the drawings.

In the rapid operation of a typewriter, it frequently occurs that a key will be struck before the carriage has reached the proper position for that key; it also happens frequently that, instead of spacing between dollars and cents or between thousands and hundreds, a key is unintentionally depressed and a character written on the paper where a space should be and, in order to prevent both of these occurrences, a guard 48 is provided (see Fig. 10). Said guard is fastened by means of screws 74 to the frame carrying the registering wheels, said guard being provided with series of recesses 48ᵃ upon its lower marginal edge adapted to receive a finger 54 which is integral with the collar 54ᵃ fixed to the shaft 75 and adapted to rock therewith. The means for rocking the shaft 75 comprise a lug 54′ which is pivotally connected by means of the screw 53′ with the arm 53, shown clearly in Figs. 12 and 15 of the drawings.

It is understood that through the mechanism herein disclosed a key cannot be depressed except when the recesses 48ᵃ in the guard 48 come directly opposite the member 54.

Referring to Fig. 10 there will be seen a bail-shaped member 52, which is fastened at one end to the collar 59 upon the shaft 75 and its other end to a collar 54ᵃ, the purpose of which is to assist in holding the teeth of the carrying pinions in alinement. As will be observed in Fig. 12 of the drawings, the edge of the bail-shaped member 52 is slightly beveled and is adapted to engage registering series of teeth formed in the carrying pinions H⁷ and master pinion H⁵. Fixed to the shaft 75 is a collar 55 to which one end of a coiled spring 56 is fastened, which latter is mounted upon said shaft 75, the other end of the spring being fastened to the plate 51, the purpose of the spring being to hold the bail-shaped member 52 in mesh with the teeth of the carrying pinion.

Referring to Fig. 8 of the drawings, it will be noted that a crank member 57 is fixed to one end of the shaft 75 and has pivotal connection with a rod 58 which in turn is adapted to actuate mechanism for alining the subtotalizer carrying pinions, illustrated in Fig. 13 of the drawings, but which mechanisms being a duplication of the ones before described it is thought that further illustration of this duplication is not necessary.

Referring to Fig. 10 of the drawings, it will be noted that the guard 48 has a finger 50 projecting from one end thereof and which in Fig. 6 of the drawings is shown in operative engagement with a series of notches intermediate the teeth of the carrying pinions to hold the same in alinement and also to prevent the depression of a key in the event of their coming out of alinement. It will also be noted that in whatever position the guard 48 may be it will hold the various carrying pinions in proper positions to allow the teeth of the registering wheels above to slide freely without interference. By reference to Fig. 12 of the drawings, it will be noted that the finger 50 and the bail-shaped member 52 with the beveled edge coöperate with each other in alining the master and carrying pinions, this being facilitated by the mounting of the carrying pinions and registering wheels upon ball bearings, as shown in Figs. 4 and 5 of the drawings and as hereinbefore described. In this connection, attention is called to the precautions in my improved calculating mechanism for holding by distinct mechanisms each of the series of master carrying pinions and registering wheels which is absolutely essential in order to allow one series to slide in parallel relation with the other without any interference and which has been the great obstacle and which has heretofore prevented the successful operation of apparatus of this nature.

Referring to Figs. 10 and 11 of the drawings, it will be noted that the notches 48ᵃ formed in the guard 48 are arranged in groups with considerable space intervening between each group. This detailed construction is provided so that the pinions $A^{60}$ and $A^{61}$, interposed at intervals between the registering wheels, will allow for the grouping of the numerals in the manner shown in Fig. 10 of the drawings. Referring to the bar 91 heretofore described, it will be noted that the same is provided with a series of fingers 100 which project at right angles from the bar and are normally positioned immediately over the upper edge of the bar 41 and are provided for the purpose of limiting the initial movements of the motor driven rack bars. In this connection, it will be noted that, when the lugs 100 are depressed by the projecting foot-piece 101$^a$ upon a rack bar, the hook portion 126, shown in Figs. 23 and 33, will be thrown against a pivotal dog 125$^b$ to release the latter from the notch in the disk 125, thus allowing the return of the key to its normal position.

Referring to Fig. 20 there will be seen a series of flanged tubes 120 which are fastened in registration with one another and adapted to contain series of anti-friction balls 99, slight spaces intervening between the tubes to permit the insertion therein of any one of the various rocking segment members 111 and the amount of space between the series of balls is sufficient merely to allow one or another of said members 111 to be inserted in the series one at a time, thus preventing any other member 111 being depressed simultaneously. It will be understood that it would be fatal to allow two keys to operate simultaneously, as one might add while the other would print and to obviate this I provide the mechanism shown in Figs. 20 and 24 of the drawings. By the provisions of the balls, as shown in Fig. 24, a considerable amount of friction is avoided which would be the case in the event of fingers being employed which is common in the art to accomplish the same purpose. In order to take up the wear and adjust the anti-friction balls, I provide set screws 120$^b$ which are mounted in the threaded portions of the outer tubular casings of the series. In order to prevent the lower beveled edges of the members 111 striking the tops of the balls, the diameters of the latter should be greater than the width of the slots in order that they will not drop therein and so that the beveled edges of the member will always strike a sloping or inclined surface of the ball as it enters the space intermediate the tubular section.

The mechanism for automatically locking the adding apparatus, as illustrated in Figs. 36 and 37, comprises a depressible lever L having a key L' fastened to its upper end and which is provided with two integral hooks L$^2$ and L$^3$ of different lengths, the former of which is adapted to engage the marginal edge of a slot L$^4$ formed in the frame of the typewriter. The other hook, which has an L-shaped end, is adapted to engage underneath the shank portion of the usual shift key of the typewriter T$^{50}$ and is of such a length that, when the shift key is depressed to its lowest limit, the two hooks will be drawn downward so that the hook L$^2$ will automatically engage the marginal edge of the slot referred to. Pivotally connected to the shank portion of the lever L is a lever L$^6$, the rear end of which is bent as shown and is positioned underneath the pin 76 and affords means for causing the bar 91 to tilt in the same manner as when said bar 91 is depressed by a foot piece 101$^a$ projecting from a motor driven rack bar. This tilting movement of the bar 91, by either of the mechanisms before described, will serve to throw the lug 77$^a$ in contact with any one of the teeth 80$^a$ of the escapement wheel 80, shown in Fig. 19 of the drawings, thus securely locking the calculating mechanism. The object of this locking of the calculating mechanism is to prevent any interference with the ordinary operation of the typewriter when the calculating device is not intended to be used.

Pivotally connected to the lever L by means of a pivotal pin L$^9$ is a link L$^{10}$ which, at its lower end, has pivotal connection with a finger L$^{11}$ integral with a collar L$^{12}$ which is keyed to the shaft L$^{13}$ by means of a set screw L$^{14}$, which shaft L$^{13}$ is journaled in suitable bearings in the frame of the typewriter and a bar L$^{15}$ fastened to a guard forming a part of the typewriter. A bar L$^{17}$ is pivotally connected to a finger L$^{18}$ projecting from the collar L$^{19}$ which is held by the set screw L$^{20}$ in an adjusted position upon the shaft L$^{13}$. The rear end of the bar L$^{17}$ is pivotally connected by a screw L$^{21}$ to the bail-shaped member T$^{51}$, forming a part of the regular tabulating attachment of the typewriter.

When the frame carrying the registering wheels and the guard is in its inoperative or in the position shown in dotted lines in Fig. 3, it will be impossible to depress a numeral key, the other keys of the typewriter being free to operate. In order to make it possible to operate the numeral keys, the guard, together with the frame to which it is attached and the registering wheels, must be moved a slight distance to the left. This may be accomplished by the following mechanism:—Pivotally mounted upon the pins L$^{60}$ which are fastened to the bar 40 are the links L$^{61}$ which in turn are pivotally connected to a plate L$^{62}$. A rod L$^{63}$ is pivotally connected at L$^{64}$ to an angle lever L$^{65}$ which has an arm connected to a rod L$^{66}$, the lower end of the latter being pivotally connected to the lever L$^6$. By the provision of the mechanism described, when the plate L⁶² is moved in one direction by the rocking of the angle lever L⁶⁵ incident to a depression of the key L, the lug L⁶⁷ upon the plate L⁶², coming in contact with the member 69, will move the frame carrying the registering wheels to the left or to the position shown in dotted lines in Fig. 6 of the drawings, in which position the numeral keys of the typewriter may be operated freely without interference. Another function performed by the plate L⁶² is to raise the lug B′, shown in Fig. 2 of the drawings, and allow the latter to pass freely over the member 69 without interference, so as to prevent any movement of the frame carrying the registering wheels.

It will be understood that the calculating device may be operated either with or without the usual tabulating attachments on typewriters. Assuming that it is desired to add three columns of figures corresponding to the positions occupied by the totalizers in Fig. 3 of the drawings and that totalizer B stands corresponding to 15 on the scale of a type writer and sub-totalizer C corresponding to the scale 30 and sub-totalizer D corresponding to the scale 50, as the typewriter carriage travels to the left in the usual step by step manner and reaches a point where the sub-totalizer B assumes the position shown in dotted lines and the general totalizer assumes the position shown in dotted lines in the same figure, the apparatus is still in inoperative position but, as the lug B′ comes in contact with the angled member 69, the frame carrying the general totalizer commences to move to the left and with one spacing on the typewriter carriage the general registering wheels will be in operative positions. The sub-totalizer B will also be in its correct position for operation. In these two relative positions of the general and sub-totalizers, the first registering wheel to the left of sub-totalizer B will be in mesh with the master pinion wheel underneath the same and the registering wheel to the extreme left of the series of general totalizer will be in mesh with the master pinion immediately underneath the same. When a numeral key is depressed, as in Fig. 15, one of the casings carrying a motor driven rack bar is swung upon its pivot through the medium of the connections shown and described, causing the rack bar to come into mesh with its respective pinion 87. Immediately after this function has been performed, it being understood that the finger 50 will have been moved to the left a sufficient distance to allow the master pinion H to rotate, the bail-shaped member 52 will be thrown out of mesh with the teeth of the pinions allowing only the master pinion to turn, the carrying pinions being held by the finger 50 holding the other pinions from a rotary movement. It is essential that all of the carrying pinions be held from rotary movement at this point. The passing of the points 112 in the path shown in dotted lines in Fig. 15 of the drawings produces two effects simultaneously, one being the releasing of the member 52 from the pinion carrying wheels and the other releasing of mechanism for allowing the motor to operate by turning the member 121 so that the recess 121ᵃ will come opposite the escapement wheel 80, permitting the latter to turn freely being driven by the motor. The pinion wheel 87 which rotates with the escapement wheel 80 will cause the rack bar to be driven to its limit in one direction which will determine the amount of rotary movement imparted to the registering wheels. If, for any reason, the rack bar should fail to travel the required distance to register a certain numeral according to the particular numeral key of the typewriter depressed, the mechanism will lock and the key depressed will not return to its normal position nor can any other numeral key of the typewriter be depressed until the rack bar has traveled its complete distance and the foot piece 101ᵃ, projecting from the rack bar, has come in contact with the finger 100 which releases the locking device and permits the said key to return to its normal position. The object of this is to avoid a mistake occurring by pressing one key and the machine registering a different amount from that sought to be registered by the key depressed. This locking effect is caused in the following manner:—When the member M′ has been rotated as just indicated, by the depression of the typewriter key T⁸ releasing the motor and the parts as described, the disk 125 rotates in unison with the member M′ to a point indicated in Fig. 33 of the drawings, bringing the notch 125ᵃ in said disk 125 and allowing the dog 125ᵇ to engage therein, as shown in the drawings. This dog prevents the return rotary movement of said disk 125, as shown in Fig. 33, and the said member M′, not being permitted to return to its normal position, one of the teeth 112, shown in Fig. 15, will strike the backside of the member M² as the key depressed attempts to return to its normal position and the key is locked. As the foot piece 101ᵃ of the rack bar strikes the finger 100, it will cause the bar 91 to rock and the shouldered portion of the member 127 will be brought to bear upon the lower projecting end of the dog 125ᵇ and raise its upper end out of contact with the notch of the disk 125, thus permitting the latter to return to its normal position.

One of the functions of the finger 52 is that, as long as the locking device just described holds the machine open for operation of the motor, the finger 54 remains in contact with one of the marginal edges of the recess $B^{14}$ and prevents any traveling of the frame carrying the registering wheels. As soon as the rack bar has completed its motion and the locking device has been released in the manner described, the shaft $M'$ will be returned to its normal position by the spring 56 on the shaft 75, which return motion of the shaft $M'$ permits the bail-shaped member 52 to reëngage the teeth of the master and carrying pinions before the typewriter key $T^8$ has returned to its normal position, the object of which is to insure perfect alinement of the master and carrying pinions before the escapement of the typewriter carriage imparts to the frame carrying the general register wheels any tendency to travel forward. This operation is repeated until every wheel in the registering device has successively been brought into operative positions directly over the master pinion.

In order to release the frame carrying the registering wheels to return to its normal position indicated by dotted lines in Fig. 3, an additional spacing is imparted to the carriage of the typewriter in the usual manner which will cause the lug 68 to drop into the aperture $B^{25}$, allowing the member 69 to be disposed at an inclination so that its inclined edge will contact with the lug $B'$, raising the latter and allowing the sub-totalizer to pass on at the next spacing of the carriage and releasing the general totalizer and allowing the latter to return to its starting position, which movement is caused by the springs 44, shown in Fig. 9 of the drawings. The machine now is spaced in any of the usual manners until the sub-totalizer C comes to the position occupied by the totalizer B and the operation is repeated until the three columns have been added. It will be noted that, at this point, the general totalizer will contain the sum of all the numbers shown in the various sub-totalizers.

Referring to Fig. 1 of the drawings, it will be noted that additional sub-totalizers are provided, all of similar construction with the exception of a different arrangement of numerals upon the one which is to the extreme right and in which the numerals are arranged in reverse order from those in the other sub-totalizers and which is utilized for clearing the general totalizer and keeping a record of the totals in the general register written at the extreme right of the paper as common in cross addition.

After the foregoing operation has been performed, the typewriter carriage is returned to its normal position in the usual manner and the same operation repeated to register another series of figures. In order to clear the machine to return the registering wheels to zero, the lever 10 is swung upon its pivot or to the position shown in dotted lines, which will cause, through the gear mechanism illustrated, the shaft $H^{14}$ to rotate in reverse direction, which is the motion employed in adapting the apparatus for subtracting and dividing.

In order to equalize the tension and prevent shock upon the parts, the buffer $M^{52}$, shown in Fig. 34, will exert a uniform pressure against the face of the escapement wheel 80. It will be understood that the convolutions of the spring $M^{32}$ are in contact with one another at all times, either when the spring is in its normal position, as shown in Fig. 34 of the drawings, or when its diameter is contracted causing the member $M^{45}$ to assume the position shown in dotted lines in said figure.

In the event of the operator forgetting that the calculating device is on the machine and starts to operate the typewriter in the usual manner and strike the numeral key without the calculating device being locked, the key will refuse to be depressed owing to the fact that the finger 54 will strike the guard 48, thus reminding the operator that the lock key must be pressed in order to permit the free movement of the numeral keys. Should the operator, instead of striking a numeral, press the regular shift key of the typewriter, the calculating device will be automatically locked by the mechanism shown.

In machines provided with a tabulator, the calculating device is unlocked and set in operative position automatically by pressure on any one of the tabulating keys in the usual manner.

What I claim to be new is:—

1. A calculating apparatus for typewriters, comprising, in combination with a typewriter, two series of registering wheels and two series of carrying pinions arranged in sets, each series of carrying pinions intermeshing with one of said series of registering wheels, one series of each set having a longitudinal movement with respect to the other series of the same set, and means controlled by the keys of a typewriter for operating corresponding order of registering wheels and carrying pinions of the two series simultaneously, as set forth.

2. A calculating apparatus for typewriters, comprising, in combination with a typewriter, two series of registering wheels and two series of carrying pinions arranged in sets, each series of carrying pinions intermeshing with one of said series of registering wheels, the series of registering wheels in each set being longitudinally movable and the carrying pinions stationary, the two series of registering wheels movable in unison with the typewriter carriage, and means controlled by the keys of the typewriter for operating the corresponding order of registering wheels and carrying pinions in the two series simultaneously, as set forth.

3. A calculating apparatus for typewriters comprising, in combination with a typewriter, a longitudinally movable series of registering wheels and a series of stationary carrying pinions adapted to intermesh therewith, a second series of registering wheels suitably mounted and movable in unison with the typewriter carriage, a second set of stationary carrying pinions mounted independent of the typewriter carriage and positioned so as to engage and slide into mesh with the teeth of the second mentioned series of registering wheels at a predetermined point in their passage as the typewriter carriage moves forward in its regular step by step manner, and means for operating the corresponding order of registering wheels and the carrying pinions of both series simultaneously, as set forth.

4. A calculating apparatus for typewriters comprising, in combination with a typewriter, longitudinally movable series of registering wheels mounted independent of the typewriter carriage, a series of stationary carrying pinions also mounted independent of said carriage and of said registering wheels and positioned in the pathway of the latter and designed to engage and mesh with the teeth of the registering wheels during the longitudinal movement of the registering wheels, a plurality of frames suitably mounted upon and movable in unison with the typewriter carriage, a series of registering wheels mounted in each frame, a second series of stationary carrying pinions mounted independent of the carriage and of the last mentioned registering wheels and positioned in the pathway of the latter and designed to engage and slide into mesh with the teeth of the registering wheels carried by each of said frames at a predetermined moment in their passage *seriatim* by said carrying pinions as the typewriter carriage moves forward by the regular step by step manner, means carried by each of the frames for automatically sliding the first mentioned series of registering wheels into operative position and into mesh with their respective carrying pinions and from order to order in unison with the movement of the registering wheels carried by said frame as it arrives at an operative position in the step by step forward movement of the typewriter carriage, means for returning the first mentioned series of registering wheels to its inoperative position before the registering wheels carried by the next frame reach an operative position, and means controlled by the depression of the keys of the typewriter for operating the corresponding order of registering wheels and carrying pinions of both series simultaneously, as set forth.

5. A calculating apparatus for typewriters comprising, in combination with a typewriter, series of registering wheels and carrying pinions intermeshing, one of the series of registering wheels having a longitudinally sliding movement, means movable with the latter and adapted to engage the adjacent series of carrying pinions for holding the same in alinement, and mechanism actuated by the depression of the typewriter keys for controlling the registering wheels, as set forth.

6. A calculating apparatus for typewriters comprising, in combination with a typewriter, series of registering wheels and carrying pinions intermeshing, one of the series of registering wheels having a longitudinally sliding movement, a finger movable with the registering wheels having a sliding movement and adapted to engage and hold the adjacent carrying pinions in alinement, and mechanism actuated by the typewriter keys for controlling the registering wheels, as set forth.

7. A calculating apparatus for typewriters comprising, in combination with a typewriter, series of registering wheels and carrying pinions intermeshing, one of the series of registering wheels having a longitudinally sliding movement, key-actuated mechanism for holding the carrying pinions of the series adjacent to said longitudinally sliding registering wheels in alinement, and means operated by the depression of the typewriter keys for controlling the registering wheels, as set forth.

8. A calculating apparatus for typewriters comprising, in combination with a typewriter, series of registering wheels and carrying pinions intermeshing, one of the series of registering wheels having a longitudinally sliding movement, a swinging key-controlled alining member coöperating with the carrying pinions adjacent to the sliding registering wheels to hold the same in alinement, as set forth.

9. A calculating apparatus for typewriters comprising, in combination with a typewriter, a series of stationary carrying pinions, a movable frame, a series of registering wheels meshing with and adapted to move parallel with said series of carrying pinions, a finger fastened to said frame and adapted to engage the carrying pinions to hold the same from rotary movement, and means controlled by the keys of the typewriter for operating the registering wheels.

10. A calculating apparatus for typewriters comprising, in combination with a typewriter, a series of stationary carrying pinions, a movable frame, a series of registering wheels meshing with and adapted to move parallel with said series of carrying pinions, a finger fixed to said frame, a swinging bail-shaped member, key-operated mechanism controlling the latter, said member coöperating with the finger to engage the carrying pinions to hold the same from rotation, and means controlled by the keys of the typewriter for operating the registering wheels.

11. A calculating apparatus for typewriters comprising, in combination with a typewriter, a series of stationary carrying pinions, a movable frame, a series of registering wheels meshing with and adapted to move parallel with said series of carrying pinions, a finger fixed to said frame, a swinging bail-shaped member, key-operated mechanism controlling the latter, said member coöperating with the finger to engage the carrying pinions to hold the same from rotation, a series of notches in said frame, and means for holding the frame while registration is being effected, and means controlled by the keys of the typewriter for operating the registering wheels.

12. A calculating apparatus for typewriters comprising, in combination with a typewriter, a series of stationary carrying pinions, a movable frame, a series of registering wheels meshing with and adapted to move parallel with said series of carrying pinions, a finger fastened to said frame, a rock shaft, a bail-shaped member fixed thereto mechanism controlled by the numeral key of the typewriter and actuating said member, the latter coöperating with said finger to engage and hold the carrying pinions from rotation, and means controlled by the keys of the typewriter for operating the registering wheels.

13. A calculating apparatus for typewriters comprising, in combination with a typewriter, a series of stationary carrying pinions, a movable frame, a series of registering wheels meshing with and adapted to move parallel with said series of carrying pinions, a finger fastened to said frame, a rock shaft, a bail-shaped member fixed thereto and actuated by mechanism controlled by the numeral key of the typewriter and coöperating with said finger to engage and hold the carrying pinions from rotation, and means fixed to said rock shaft for engagement with said frame to hold the same while the registration is being effected.

14. A calculating apparatus for typewriters comprising, in combination with a typewriter with keys, a series of stationary carrying pinions, a movable frame, a series of registering wheels meshing with and adapted to move parallel with said series of carrying pinions, a finger fastened to said frame, a rock shaft, a bail-shaped member fixed thereto and actuated by mechanism controlled by the numeral key of the typewriter and coöperating with said finger to engage and hold the carrying pinions from rotation, a lug fastened to said rock shaft and adapted to engage the notches in said frame to hold the registering mechanism at rest while the registration is being effected.

15. A calculating apparatus for typewriters comprising, in combination with a typewriter having keys, a stationary series of carrying pinions and a series of registering wheels, means for holding the carrying pinions in alinement, independent means for holding the wheels in alinement and from rotation, and motor-actuated means controlled by the keys of the typewriter for operating the registering wheels, as set forth.

16. A calculating apparatus for typewriters comprising, in combination with a typewriter having keys, a stationary series of carrying pinions and a series of registering wheels, means for holding the carrying pinions in alinement, double ended pawls engaging the registering wheels to hold the same in alinement and controlling the rotary movement of the registering wheels, and means controlled by the keys of the typewriter for operating the registering wheels.

17. A calculating apparatus for typewriters comprising, in combination with a typewriter having keys, a stationary series of carrying pinions and a series of registering wheels, means for holding the carrying pinions in alinement, a double-ended pawl having one end engaging one registering wheel and its other end an adjacent registering wheel and adapted to control the rotary movements of the registering wheels, and means controlled by the keys of the typewriter for operating the registering wheels.

18. A calculating apparatus for typewriters comprising, in combination with a typewriter having keys, a stationary series of carrying pinions and a series of registering wheels, means for holding the carrying pinions in alinement, a series of swinging fingers adjacent to the registering wheels, a double-ended pawl pivotally mounted upon each finger, a bar coöperating with the pawls for holding the registering wheels in alinement, and means controlled by the keys of the typewriter for operating the registering wheels.

19. A calculating apparatus for typewriters comprising, in combination with a typewriter having keys, a stationary series of carrying pinions and a series of registering wheels, means for holding the carrying pinions in alinement, a series of swinging fingers adjacent to the registering wheels, a double-ended pawl pivotally mounted upon each finger, a bar coöperating with the pawls for holding the registering wheels in alinement, each of said registering wheels being recessed and adapted to receive one end of the double pawl to permit the escapement of another registering wheel, and means controlled by the keys of the typewriter for operating the registering wheels.

20. A calculating apparatus for typewriters comprising, in combination with a typewriter, a stationary series of carrying pinions and a series of registering wheels, means for holding the carrying pinions in alinement, a series of swinging fingers adjacent to the registering wheels, a double-ended pawl pivotally mounted upon each finger, a bar having a recess therein to allow one of said fingers to tilt, a projection upon the bar to engage the registering wheels to hold the same in alinement.

21. A calculating apparatus for typewriters comprising, in combination with a typewriter, a series of registering wheels, a hollow core or sleeve about which the wheels rotate, a rod adapted to be received loosely by said sleeve and adapted to have a sliding back and forth movement, a series of stationary carrying pinions, and means for holding the same in alinement, as set forth.

22. A calculating apparatus for typewriters comprising, in combination with a typewriter, series of registering wheels and carrying pinions adapted to intermesh, one series designed to have a longitudinally sliding movement with respect to the adjacent series, a motor, a series of motor-driven rack bars adapted to control the rotary movements of the registering wheels, mechanism for throwing the rack bars into operative relation, and means for automatically locking the rack bars in operative position until the rotary movement of the registering wheels is complete, as set forth.

23. A calculating apparatus for typewriters comprising, in combination with a typewriter having keys, series of registering wheels and carrying pinions adapted to intermesh, one of the series designed to have a longitudinally sliding movement, a motor, a series of motor-driven rack bars adapted to control the rotary movements of the registering wheels, key-controlled mechanism for throwing the rack bars in operative positions, and means for automatically locking said rack bars into operative position until released by the motor, driving said rack bars to their limits, as set forth.

24. A calculating apparatus for typewriters comprising, in combination with a typewriter, series of registering wheels and carrying pinions adapted to intermesh, one of the series designed to have a longitudinally sliding movement, a motor, a series of motor-driven rack bars, each of a distinct length and adapted to impart different rotary movements to the various registering wheels, means for limiting the movement of each rack bar, mechanism for automatically locking the rack bars in operative positions until said rack bars shall have been driven to their limits in one direction by said motor, and means for releasing the same when its full stroke shall have been completed, as set forth.

25. A calculating apparatus for typewriters comprising, in combination with a typewriter, series of registering wheels and carrying pinions adapted to intermesh, one of the series adapted to have a longitudinal sliding movement, a series of swinging casings, a longitudinally movable rack bar in each casing, a motor, a motor driven shaft, pinions fixed to the latter, and key-controlled mechanism for moving the rack bars into mesh with said pinions, affording means for regulating the rotary movements of the registering wheels.

26. A calculating apparatus for typewriters comprising, in combination with a typewriter having keys, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging and longitudinally movable rack bars, means for moving the latter into mesh with said pinions, and mechanism controlled by the rack bars for locking the escapement wheel, as set forth.

27. A calculating apparatus for typewriters, comprising, in combination with a typewriter having keys, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging, spring-actuated rack bars, means for throwing the same into mesh with said pinions, and mechanism actuated by the rack bars for locking the escapement wheel, as set forth.

28. A calculating apparatus for typewriters comprising, in combination with a typewriter, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging, spring-actuated rack bars, means for throwing the same into mesh with said pinions, a projection upon each rack bar, and means actuated by said projections for locking the escapement wheel, as set forth.

29. A calculating apparatus for typewriters comprising, in combination with a typewriter having keys, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging, spring-actuated rack bars, means for throwing the same into mesh with said pinions, a projection upon each rack bar, a rocking bar actuated by said projections and adapted to lock the escapement wheel, as set forth.

30. A calculating apparatus for typewriters comprising, in combination with a typewriter having keys, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging, spring-actuated rack bars, means for throwing the same into mesh with said pinions, a projection upon each rack bar, a rocking bar having lugs projecting therefrom in the path of said projections, and a locking device actuated by said rocking bar and adapted to lock the escapement wheel, as set forth.

31. A calculating apparatus for typewriters, comprising, in combination with a typewriter having keys, a series of registering wheels and carrying pinions adapted to intermesh, one of the series adapted to have a longitudinally sliding movement, a motor and shaft driven thereby, an escapement wheel fixed to said shaft, key-controlled mechanism for releasing the escapement wheel and allowing the same to rotate, pinions keyed to said shaft, a series of swinging, spring-actuated rack bars, means for throwing the same into mesh with said pinions, a projection upon each rack bar, a rocking bar having lugs projecting therefrom in the path of said projections, said bar having a hooked portion at one end and designed, as the rocking bar is rotated, to engage and lock the escapement wheel, as set forth.

32. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, a rock shaft, a rocking recessed member, a shaft fitted to said member and adapted to rock the same to bring the recessed portion of the member opposite the escapement wheel to allow the same to rotate therein, pinions fixed to the shaft carrying the escapement wheel, series of longitudinally movable swinging rack bars, means for throwing the same in mesh with said pinions, and means actuated by the rack bars for locking the escapement wheel.

33. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, a rock shaft, a rocking recessed member, a shaft fitted to said member and adapted to rock the same to bring the recessed portion of the member opposite the escapement wheel to allow the same to rotate therein, pinions fixed to the shaft carrying the escapement wheel, series of longitudinally movable swinging rack bars, means for throwing the same in mesh with said pinions, a rocking bar having lugs projecting therefrom, each in the path of a projection upon the rack bar, and an integral hook at the end of said bar adapted to lock the escapement wheel.

34. A calculating apparatus for typewriters comprising, in combination with a typewriter having keys, series of registering wheels and carrying pinions adapted to intermesh, one of the series adapted to have a longitudinal sliding movement, a motor, a motor driven shaft, an escapement wheel fixed thereto, a rock shaft, a yoke fastened to the frame of the apparatus, a rocking recessed member journaled in said yoke, a key-controlled shaft having a contracted end engaging a socket in the end of said rocking recessed member, a series of swinging longitudinal movable rack bars, pinions upon the shaft carrying the escapement wheel, means for throwing the rack bars into mesh with said pinions, and means actuated by the rack bars for locking the escapement wheel.

35. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments and shaft upon which the same are mounted, each segment adapted to swing a casing in which the rack bar is mounted to bring the latter into mesh with said pinions, means actuated by the swinging of the segment for releasing the escapement wheel, and means for locking the escapement wheel.

36. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments and shaft upon which the same are mounted, each segment adapted to swing a casing in which the rack bar is mounted to bring the latter into mesh with said pinions, means actuated by the swinging of the segment for releasing the escapement wheel, mechanism for holding the rack bars out of mesh with the pinions when the keys are in their inoperative positions, and means for locking the escapement wheel.

37. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments and shaft upon which the same are mounted, a headed projection upon each casing, each segment provided with a curved slot, an offset adjacent to one end, said slot and offset designed to receive said headed projection, depressible key levers and connections between the same and said segments, means actuated by the depression of a key lever designed for releasing the escapement, and mechanism actuated by the rack bars for locking the escapement.

38. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments and shaft upon which the same are mounted, a headed projection upon each casing, each segment provided with a curved slot, an offset adjacent to one end, said slot and offset designed to receive said headed projection, depressible key levers and connections between the same and said segments, projections upon the segment, lugs upon the shaft adapted for releasing the escapement, said lugs positioned in the path of said projections, and means actuated by the rack bars for locking the escapement wheel.

39. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments and shaft upon which the same are mounted, a headed projection upon each casing, each segment provided with a curved slot, an offset adjacent to one end, said slot and offset designed to receive said headed projection, depressible key levers and connections between the same and said segments, projections upon each segment, lugs upon the shaft adapted for releasing the escapement, said lugs positioned in the path of said projections, means actuated by the rack bars for locking the escapement wheel, and means for holding said lugs in the path of the projection upon the segments until released by the rack bar.

40. A calculating apparatus for typewriters comprising, in combination with a typewriter, series of registering wheels and carrying pinions adapted to intermesh, one of the series adapted to have a longitudinal sliding movement, a motor, a motor driven shaft, an escapement wheel fixed thereto, pinions upon said shaft, gear connections between the pinion shaft and registering wheels, a series of swinging casings, a longitudinally movable rack bar in each of said casings, a series of rocking segments, a shaft upon which the same are mounted, a key lever and connections between the same and each of said segments, each segment adapted to swing a rack bar as the key is depressed, lateral projections upon each segment, lugs projecting from the shaft and designed to release the escapement wheel, a notched disk upon the shaft carrying said lugs, a spring-pressed dog adapted to engage the notch of said disk to hold the lugs in the paths of said projections on the segment, means for holding said dog in a locked position, and means actuated by a rack bar for locking the escapement wheel and simultaneously releasing said dog.

41. A calculating apparatus for typewriters comprising, in combination with a typewriter, series of registering wheels and carrying pinions adapted to intermesh, one of the series adapted to have a longitudinal sliding movement, a rock shaft, a bail-shaped member fastened thereto and designed to hold the carrying pinions in alinement, an escapement wheel and motor driven shaft upon which the same is mounted, means for allowing the escapement wheel to rotate, a second rock shaft and means actuated thereby for releasing the escapement wheel, a pivot carrying projection fixed to said second referred to rock shaft, a bar having an elongated slot in which said pivot has a slight movement, a spring fixed to said projection and to said var. one end of the latter being pivotally connected to the rock shaft to which said bail-shaped member is fastened.

42. A calculating apparatus for typewriters comprising, in combination with a typewriter having a carriage, series of stationary carrying pinions and means for holding the same in alinement, a frame mounted independent of the typewriter carriage and containing a series of registering wheels and in inoperative positions, a plurality of sub-totalizer frames, a series of registering wheels in each of the latter, said sub-totalizer frames mounted upon and movable with the typewriter carriage, mechanism actuated by each series of registering wheels in the sub-totalizer frame for bringing into operative position the registering wheels of the first referred to frame, and means independent of the carriage for rapidly returning said first referred to frame to its initial inoperative position, as set forth.

43. A calculating apparatus for typewriters comprising, in combination with a typewriter having a carriage, a master wheel and a series of stationary carrying pinions, means for holding the same in alinement, a frame mounted independent of the typewriter carriage and said master wheel and carrying pinions, a series of registering wheels carried by said frame and normally held out of mesh with said master wheel and carrying pinions but adapted to slide into and out of mesh with the latter by a back and forth movement independent of the typewriter carriage and in a plane parallel to the teeth of the master wheel and carrying pinions, a series of other frames, registering wheels in said series of frames, means for holding the registering wheels and series of frames in which they are contained in alinement, said registering wheels in said series of frames being mounted upon and movable with the typewriter carriage, means actuated by the series of frames for imparting an accelerated longitudinal movement to the first referred to frame for the purpose of positioning the registering wheels contained therein in an operative relation to their respective carrying pinions and master wheel simultaneously with the registering wheels contained in any one of the series of frames being placed in an operative relationship to their respective master wheel and carrying pinions by the regular step by step movement of the typewriter carriage, and means independent of the typewriter carriage for rapidly returning the first referred to frame and registering wheels contained therein to their initial inoperative position immediately after the registering of each number without interference with the continued regular step by step advancement of the typewriter carriage, as set forth.

44. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame and a movable rack bar independent of the frame, pinions of different diameters rotating in unison and one meshing with one rack bar and the other with the other, a second frame and registering wheels therein, a notched bar fixed to the carriage and upon which said second frame is mounted and adapted to impart a rotary movement to the pinions as the carriage is moved.

45. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame and a movable rack bar independent of the frame, pinions of different diameters rotating in unison and one meshing with one rack bar and the other with the other, a notched bar fixed to the carriage, a second and adjustable frame and registering wheels mounted therein, said second frame being mounted upon said notched bar and adapted to actuate said pinions whereby an accelerated movement may be imparted to the registering wheels.

46. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar, pinions of different diameters one meshing with each rack bar, and means actuated by the carriage of the typewriter for rotating the pinion whereby an accelerated movement may be imparted to the frame carrying the registering wheels.

47. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar, pinions of different diameters one meshing with each rack bar, a notched bar movable with the carriage, a sub-totalizer mounted upon said bar and adapted to move one of said rack bars to rotate the pinions whereby accelerated movement may be imparted to the frame carrying the registering wheels, and means for automatically breaking the connection between the sub-totalizer frame and the movable rack bar to allow the typewriter carriage to move freely without further action upon the calculating apparatus.

48. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar and frame having slots therein upon which the same is mounted, a pivotal trap regulating one of said slots, a notched bar fixed to the carriage, a sub-totalizer frame mounted upon said notched bar, a pivotal member upon said movable rack bar and positioned in the path of the frame of the sub-totalizer and adapted to be actuated thereby, a lug or projection on said pivotal member designed to pass through one of the slots when moving in one direction and through the trap regulated slot on its return movement.

49. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar and frame having slots therein upon which the same is mounted, a pivotal trap regulating one of said slots, a notched bar fixed to the carriage, a sub-totalizer frame mounted upon said notched bar, a pivotal member upon said movable rack bar and positioned in the path of the frame of the sub-totalizer and adapted to be actuated thereby, a lug on said pivotal member designed to pass through one of the slots when moving in one direction and through the trap regulated slot on its return movement, and means for guiding said lug on the pivotal member as it moves up through the trap-regulated slot.

50. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar and frame having slots therein upon which the same is mounted, a pivotal trap regulating one of said slots, a notched bar fixed to the carriage, a sub-totalizer frame mounted upon said notched bar, a pivotal member upon said movable rack bar and positioned in the path of the frame of the sub-totalizer and adapted to be actuated thereby, said pivotal member designed to pass through one of the slots when moving in one direction and through the trap regulated slot on its return movement, an angled member fastened to the frame carrying the movable rack bar and adapted to guide the pivotal member as it passes through the trap-regulated slot.

51. A calculating apparatus for typewriters comprising, in combination with a typewriter having a carriage, a series of stationary carrying pinions, means for holding the same in alinement, a series of registering wheels, a sliding frame in which said registering wheels are mounted, a rack bar formed upon said frame, a spring-actuated rack bar and frame having slots therein, one of which has beveled edges, a pivotal trap fixed to the frame and having beveled edges engaging the beveled edge slot, a notched bar fastened to the typewriter carriage, a sub-totalizer frame mounted upon said notched bar, a pivotal angled member mounted upon the movable rack bar and adapted to move freely over the slot bridged by the trap when moving in one direction and falling through the other slot, and on its return movement designed to raise the trap and pass through the slot closed thereby.

52. In combination with the frame of a typewriter, longitudinally movable series of registering wheels and pinion carrying wheels in mesh therewith, means for imparting intermittent movement to the registering wheels, a notched bar fastened to the carriage of the typewriter, a sub-totalizer frame mounted upon said notched bar, a spring-pressed plate upon the sub-totalizer frame and provided with fingers adapted to engage the notches of said bar, a lever adapted to bear against said spring-pressed plate, and gear connections between the carrying pinions and wheels of the sub-totalizer, and means for holding the sub-totalizer frame rigidly against any lateral motion caused by the rotary movement of the registering mechanism.

53. In combination with a typewriter frame having a carriage and keys mounted thereon, a longitudinally movable series of registering wheels and frame therefor, a series of carrying pinions in mesh with the registering wheels, means controlled by the keys of the typewriter for imparting intermittent movements to the registering wheels, a rack bar upon said frame, a movable spring-pressed rack bar and frame to which the same is mounted, pinion wheels of different diameters, one meshing with each rack bar, a notched bar fastened to the typewriter carriage, a sub-totalizer and frame therefor, a movable fingered bar fastened to the sub-totalizer frame, series of registering wheels in said sub-totalizer frame, pivotal fingers and double-ended pawls carried by the latter, a pivotal member carried by the fingered plate, and an angled member projecting from the movable rack bar and adapted to contact with said pivotal member upon the finger plate as the sub-totalizer is moved in one direction.

54. In combination with a typewriter frame having a carriage and keys mounted thereon, a longitudinally movable series of registering wheels and frame therefor, a series of carrying pinions in mesh with the registering wheels, means controlled by the keys of the typewriter for imparting intermittent movements to the registering wheels, a rack bar upon said frame, a movable spring-pressed rack bar and frame to which the same is mounted, pinion wheels of different diameters, one meshing with each rack bar, a notched bar fastened to the typewriter carriage, a sub-totalizer and frame therefor, a movable fingered bar fastened to the sub-totalizer frame, series of registering wheels in said sub-totalizer frame, pivotal fingers and double-ended pawls carried by the latter, a pivotal member carried by the fingered plate, an angled member projecting from the movable rack bar and adapted to contact with said pivotal member upon the finger plate as the sub-totalizer is moved in one direction, and an angled member projecting from the sub-totalizer frame and engaging an overhanging portion of the frame of the apparatus.

55. In combination with the frame of a typewriter having a calculating apparatus and a platen and shifting mechanism, a motor driven escapement wheel, a locking lever pivotally mounted upon the frame of the typewriter, pivotal connection between the locking lever and the platen shifting mechanism of the typewriter whereby, as the shifting mechanism is depressed, the escapement wheel is automatically locked.

56. In combination with the frame of a typewriter having a calculating apparatus and a platen and shifting mechanism, a motor driven escapment wheel, a locking lever pivotally mounted upon the frame of the typewriter, pivotal connection between the locking lever and the platen shifting mechanism of the typewriter whereby, as the shifting mechanism is depressed, the escapement wheel is automatically locked, a tabulating attachment, and means actuated by one of the keys of the latter to release the locking mechanism.

57. In combination with the frame of a typewriter provided with a shifting key and having shifting and tabulator keys, a calculating apparatus upon said frame, a motor driven escapement wheel, a locking lever pivotally connected to the frame of the apparatus and having two hooks, one of which is adapted to engage the edge of the slot formed in the frame of a typewriter and the other disposed underneath the shift key, and pivotal connections between the locking lever and the tabulator keys of the machine.

58. In combination with the frame of a typewriter having shifting and tabulator keys, a calculating apparatus upon said frame, a motor driven escapement wheel, a locking lever pivotally connected to the frame of the apparatus and having two hooks, one of which is adapted to engage the edge of the slot formed in the frame of a typewriter and the other disposed underneath the shift key, a rock shaft mounted upon the frame of the typewriter and having adjustable link connections with the locking lever, a tabulating key operating mechanism, and pivotal bar connections between the latter and said rock shaft.

59. In a calculating apparatus for typewriters, an escapement wheel, a motor, connections between the same and said wheel, and a friction brake actuated by the motor and adapted to regulate the movements of the escapement wheel.

60. In a calculating apparatus for typewriters, an escapement wheel, a motor, connections between the same and said wheel, a friction brake actuated by the motor and adapted to regulate the movements of the escapement wheel, and a pivotal friction brake mechanism adapted to be moved by the motor into contact with said escapement wheel.

61. In a calculating apparatus for typewriters, an escapement wheel, a motor, connections between the same and said wheel, a friction brake actuated by the motor and adapted to regulate the movements of the escapement wheel, a pivotal friction brake mechanism, and adjustable means carried by the friction brake and actuated by said motor.

62. In combination with the frame of a typewriter, a calculating apparatus, a motor comprising a cylindrical casing, a shaft mounted therein, a coiled spring fixed at one end to said shaft, a collar upon the latter to which the other end is fastened, said collar having a projection extending through a slot in the shell, an escapement wheel, gear connections between the same and the motor, a pivotal friction member, one adapted to bear against said wheel and be actuated by said projection upon the collar.

63. In combination with the frame of a typewriter, a calculating apparatus, a motor comprising a cylindrical casing, a shaft mounted therein, a coiled spring fixed at one end to said shaft, a sliding collar upon the latter to which the other end is fastened, the convolutions of the spring being in contact with one another, the diameter of the spring being adapted to be lessened and the spring elongated as it is put under tension, thereby imparting a movement to the collar upon the shaft, a pivotal friction member, one end of which is adapted to bear against the escapement wheel and the other end in the path of a lug projecting from said collar.

64. In combination with the frame of a typewriter, a calculating apparatus comprising a longitudinally movable series of registering wheels and carrying pinions adapted to mesh therewith, shafts upon which the two series are mounted, an escapement wheel and shaft upon which the same is mounted, gear connections between the shaft carrying the escapement wheel and the carrying pinions, a longitudinally movable shell upon the carrying pinion shaft, a lever pivoted upon the frame of the apparatus and having pivotal connection with said shell and affording means whereby the gear connections may be shifted to adapt the apparatus for adding or subtracting.

65. A calculating apparatus for typewriters having keys comprising, in combination with a typewriter, a series of registering wheels and a series of carrying pinions, said series of registering wheels being normally out of mesh with the teeth of the carrying pinions and designed, during the operation of the calculating apparatus, to intermesh one series with the other by the frame of the registering wheels mounted therein moving in a plane parallel to the carrying pinions, means for holding the latter in alinement, and motor-actuated means controlled by the keys of a typewriter for causing intermittent movements to be imparted to the registering wheels, as set forth.

In testimony whereof I hereunto affix my signature in the presence of two witnesses.

HENRY L. PITMAN.

Witnesses:
A. L. HOUGH,
FRANKLIN H. HOUGH.